(12) United States Patent
Huang

(10) Patent No.: US 7,614,484 B2
(45) Date of Patent: Nov. 10, 2009

(54) HYDRAULIC DISC BRAKE DEVICE

(76) Inventor: Tan-Cheng Huang, 6Fl., No.2-1, Swei St., Taichung (TW)

( * ) Notice: Subject to any disclaimer, the term of this patent is extended or adjusted under 35 U.S.C. 154(b) by 383 days.

(21) Appl. No.: 10/596,255

(22) PCT Filed: Dec. 26, 2003

(86) PCT No.: PCT/CN03/01131

§ 371 (c)(1),
(2), (4) Date: Jun. 15, 2007

(87) PCT Pub. No.: WO2005/063534

PCT Pub. Date: Jul. 14, 2005

(65) Prior Publication Data

US 2007/0251771 A1 Nov. 1, 2007

(51) Int. Cl.
*F16D 55/02* (2006.01)

(52) U.S. Cl. .................. 188/71.8; 188/181 A; 188/18 A

(58) Field of Classification Search ................. 188/71.8, 188/72.1, 24.19, 72.4, 72.6, 73.1, 73.39, 188/73.42, 73.43, 73.46, 26, 17, 18 A, 181 A, 188/181 T See application file for complete search history.

(56) References Cited

U.S. PATENT DOCUMENTS

| 6,244,391 B1 * | 6/2001 | Bunker ................ 188/18 A |
| 6,786,308 B1 * | 9/2004 | Huang ................ 188/24.12 |
| 6,959,790 B2 * | 11/2005 | Huang ................ 188/26 |

* cited by examiner

*Primary Examiner*—Melanie Torres
(74) *Attorney, Agent, or Firm*—Banger Shia

(57) ABSTRACT

A hydraulic disc brake device comprises: a base assembly mounted on a vehicle, a sliding assembly slideably mounted on the base assembly, a return spring disposed between the base assembly and the sliding assembly, a brake lining assembly, a control valve assembly disposed on the oil pressure system, hydraulic disc brake system that has an antilock effect. The hydraulic disc brake is low cost and has an antilock function.

40 Claims, 19 Drawing Sheets

HYDRAULIC DISC BRAKE DEVICE

BACKGROUND OF THE INVENTION

1. Field of the Invention

The present invention relates to a hydraulic disc brake device, and more particularly to a hydraulic disc brake device used in a brake system of a vehicle.

2. Description of the Prior Art

Most of the conventional hydraulic disc brake devices utilize the oil cylinder to press the two brake lining shoes against the brake disc from both sides, and the friction force generated between the brake lining shoe and the brake disc stops the vehicle. However, these conventional hydraulic disc brake devices still have the following disadvantages:

The clamping force caused by the oil pressure in the case of an emergency brake is always very great, and the resultant braking force will be excessively large, and thus probably causing a sudden dead lock. As a result, not only will the tire be locked, but also the vehicle will suffer an instant run-out, leading to a skidding or overturning of the vehicle.

The present invention has arisen to mitigate and/or obviate the afore-described disadvantages.

SUMMARY OF THE INVENTION

The primary objective of the present invention is to provide a hydraulic disc brake system that has an antilock effect.

The secondary objective of the present invention is to provide an economical and low cost hydraulic disc brake system for a vehicle, without needing any precision electronic instruments or electric mechanism.

DETAILED DESCRIPTION OF THE PREFERRED EMBODIMENTS

Figure 1:
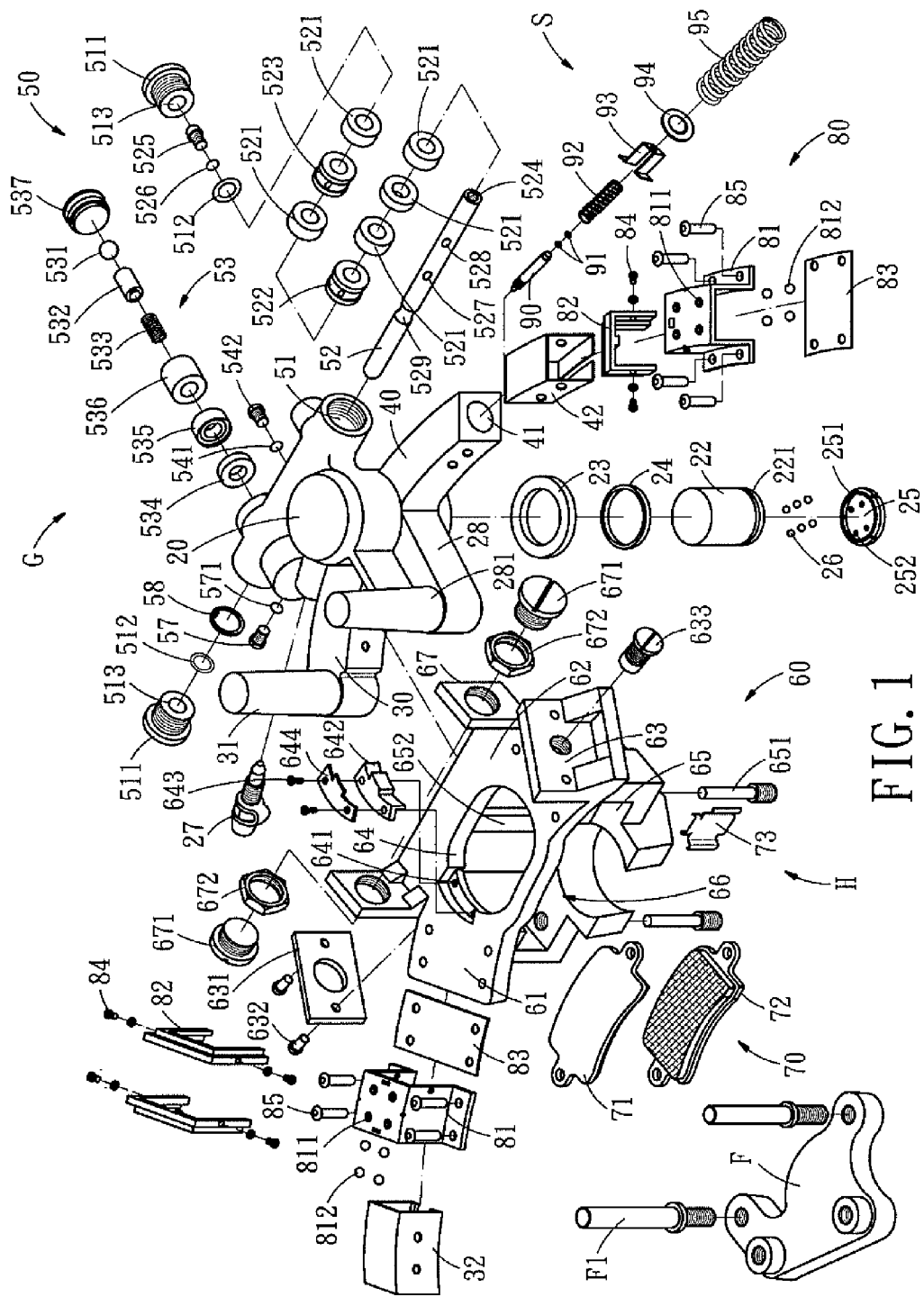
FIG. 1 is an exploded view of a hydraulic disc brake device in accordance with a first embodiment of the present invention.
Figure 2:
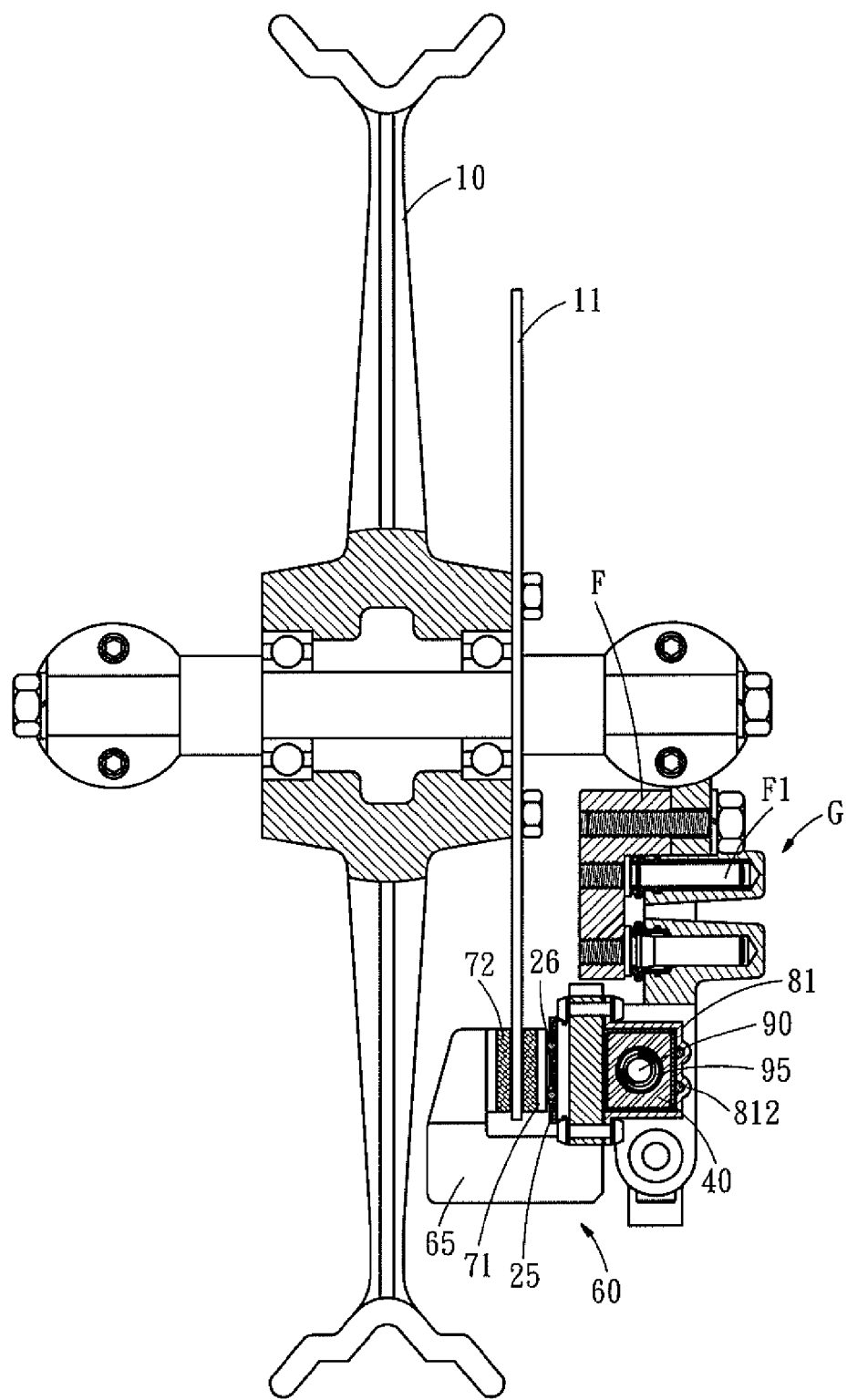
FIG. 2 is an assembly cross sectional view of the hydraulic disc brake device in accordance with the first embodiment of the present invention.
Figure 3:
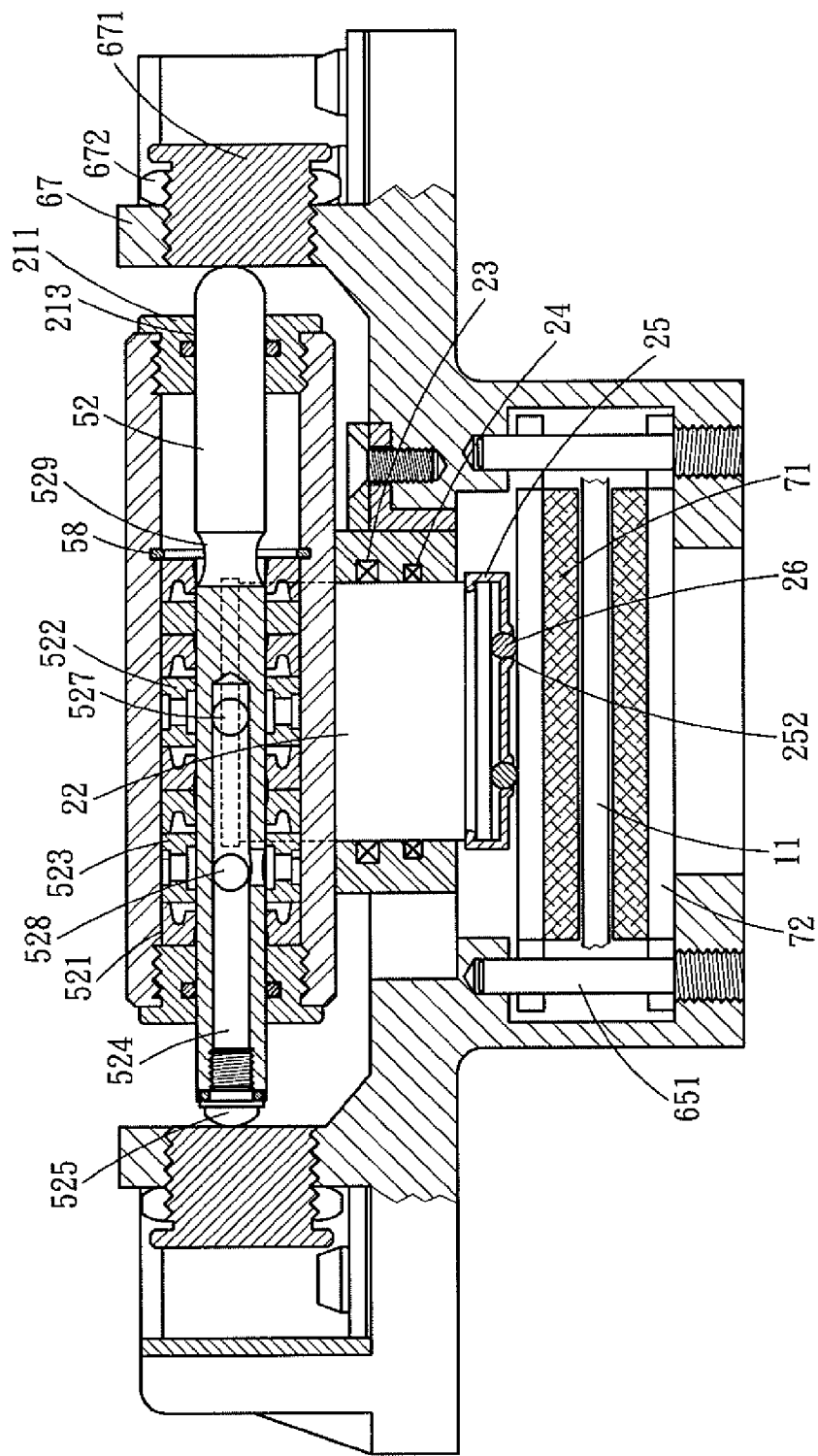
FIG. 3 is another assembly cross sectional view of the hydraulic disc brake device in accordance with the first embodiment of the present invention.

Referring to FIGS. 1-5, a hydraulic disc brake device in accordance with the present invention is installed on a wheel carrier 10 and comprises: a base assembly G, a sliding assembly H, a spring assembly S and a positioning board F. Oil W circulates within the base assembly G.

The positioning board F is fixed on the wheel carrier 10 by screws, and is provided with two positioning bolts F1.

The base assembly G is positioned on the wheel carrier 10 by the positioning board F and comprises: a pressing device 20, a first arc-shaped track 30, a second arc-shaped track 40, and a control valve assembly 50.

The pressing device 20 includes an oil chamber 21, a piston 22, two oil seals 23, 24, a steel-ball positioning disc 25 and a plurality of steel balls 26. A positioning arm 28 protrudes from a side of the pressing device 20 and is to be positioned on one of the positioning bolts F1 by a positioning sleeve 281. The piston 22 is moveably sealed in the oil chamber 21 by the oil seals 23 and 24. The piston 22 is defined in its outer edge with an engaging groove 221, and the steel-ball positioning disc 25 is formed around its outer periphery with a protrusive engaging edge 251 to be engaged in the engaging groove 221. The plurality of steel balls 26 is positioned between the steel-ball positioning disc 25 and the piston 22. A plurality of through holes 252 is defined in the steel-ball positioning disc 25, and the respective steel balls 26 partially protrude from the through holes 252. An exhaust valve 27 is disposed adjacent to the oil chamber 21.

The first arc-shaped track 30 is located correspondingly to the center of the brake disc 11 and is disposed at a side of the pressing device 20, and an end of the first arc-shaped track 30 is positioned on another one of the positioning bolts F1 by a positioning sleeve 31. The first arc-shaped track 30 is covered with a wear-resistance cover 32.

The second arc-shaped track 40 is located correspondingly to the center of the brake disc 11 and is square in cross section. A hole 41 is defined in the second arc-shaped track 40 and is located along the length thereof, and the second arc-shaped track 40 is located at another side of the pressing device 20 and also covered with a wear-resistance cover 42. A safety oil passage 43 is formed in the bottom of the hole 41 and connected to the oil chamber 21.

The control valve assembly 50 includes a control groove 51, a control rod 52, a relief valve 53, a main passage 54, an auxiliary passage 55 and a pressure relief space 56. The control groove 51 is located adjacent to the oil chamber 21. A guide cover 511 with a central hole 513 and a dust-proof ring 512 is screwed to either side of the control groove 51. Both ends of the control rod 52 are protruded out of the center hole 513 of the two guide covers 511. The control groove 51 is connected to the oil chamber 21 via the main passage 54 and the pressure relief space 56, and the auxiliary passage 55 is connected to the safety oil passage 43 of the second arc-shaped track 40. A sealing screw 542 cooperating with a sealing ring 541 is disposed opposite the main passage 54. Located opposite the auxiliary passage 55 is an oil feeding hole 551. The relief valve 53 includes a pressure relief steel ball 531, a pin 532 and a spring 533 disposed in the pressure relief space 56, respectively. A sealing screw 57 with a sealing ring 571 is disposed beside the pressure relief space 56. The pin 532 is to be pressed against the spring 533 and the oil pressure of the oil chamber 21. The pressure relief steel ball 531 is located in the control groove 51, and the pin 532 is sealed between the oil chamber 21 and the control groove 51 together with a first sliding bush 534, an oil seal 535, a second sliding bush 536 and an dust-proof cover 537. A plurality of oil seals 521, a first oil ring 522, a second oil ring 523 and a sliding bush 59 are positioned in the mid section of the control groove 51 by a C ring 58. The first and second oil rings 522 and 523 each is formed with an open guiding structure for guiding oil out. The first oil ring 522 is located correspondingly to the main passage 54, and the second oil ring 523 is located correspondingly to the auxiliary passage 55. The control rod 52 is formed with a control passage 524, and an oil seal 526 and a sealing screw 525 are screwed in the end of the control passage 524. A first oil hole 527 and a second oil hole 528 are formed in the control passage 524 and are located correspondingly to the first oil ring 522 and the second oil ring 523, respectively. An annular neck portion 529 is formed on the control rod 52 and is located correspondingly to the pressure relief space 56. When the pressure relief steel ball 531 moves into the annular neck portion 529, a pressure relief oil space B will appear at another end of the pin 532 opposite the pressure relief steel ball 531.

The sliding assembly H is slideably disposed on the first and second arc-shaped track 30 and 40 of the base assembly G and includes a seat 60, a brake lining assembly 70 and a sliding device 80.

The seat 60 includes a first positioning portion 61 and a second positioning portion 62 located correspondingly to the first and the second arc-shaped tracks 30 and 40 of the base assembly G. A stop portion 63 is formed at the end of the second positioning portion 62. An anti-collision piece 631 is fixed on the stop portion 63 by screws 632. A screw 633 is disposed at the center of the stop portion 63 and the anti-collision piece 631. Formed between the first and second positions 61 and 62 is an elliptical sliding hole 64 for passage of the piston 22 of the pressing device 20 and the flange G1 of the base assembly G. A stepped recess 641 is formed at a side of the elliptical sliding hole 64, and an anti-collision block 642 and a fixing piece 644 are fixed in the stepped recess 641 by screws 643. A brake-mounting portion 65 protrudes from the seat 60 and is located around the elliptical sliding hole 64, so that a brake space 66 is defined between the brake-mounting portion 65 and the elliptical sliding hole 64 for accommodation of the brake disc 11 and the brake lining assembly 70. Screwed on the brake-mounting portion 65 are two brake-lining positioning shafts 651 that are to be inserted in the seat 60 and located at both sides of the elliptical sliding hole 64. The brake-mounting portion 65 is provided with an engaging rib 652 located in the brake space 66. Two opposite abutting blocks 67 are arranged at a side of the elliptical sliding hole 64, and each of which is provided with an abutting screw 671 and an auditing nut 672. The two abutting blocks 67 are pressed against both ends of the control rod 52.

The brake lining assembly 70 includes a front brake lining shoe 71 and a rear brake lining shoe 72 that are inserted on the two brake-lining positioning shafts 651 in a parallel manner, and the brake-lining positioning shafts 651 enables the front brake lining shoe 71 and the rear brake lining shoe 72 to move within the brake space 66. A pressing spring leaf 73 is disposed against a side of the front brake lining shoe 71 and the rear brake lining shoe 72 and is positioned on the engaging rib 652 of the brake-mounting portion 65 of the seat 60, thus preventing the front brake lining shoe 71 and the rear brake lining shoe 72 from becoming loose. In addition, the front brake lining shoe 71 is pressed against the steel balls 26 on the steel ball positioning disc 25, and can move smoothly under the aid of the steel balls 26.

The sliding device 80 includes inverted U-shaped seats 81, dust-proof frames 82 and wear-resistance pieces 83. The inverted U-shaped seats 81 are fixed on the first and second positioning portions 61 and 62 of the seat 60 by rivets 85. The inverted U-shaped seats 81 are slideably mounted on the first and second arc-shaped tracks 30 and 40. A plurality of cavities 811 with steel balls 812 are formed in the respective inverted U-shaped seats 81, and the steel balls 812 are located between the inverted U-shaped seat 81 and the wear-resistance cover 32 and 42. The respective dust-proof frame 82 is fixed to the inverted U-shaped seat 81 by screws 84, so as to prevent dust from entering the arc-shaped tracks.

The spring assembly S is confined in the hole 41 of the second arc-shaped track 40 by the anti-collision piece 631 and the screw 633 of the sliding assembly H, and includes a safety rod 90, two seal rings 91, a safety spring 92, a support bracket 93, a washer 94 and a return spring 95. One end of the return spring 95 cooperating with the washer 94 and the support bracket 93 is pressed against the bottom of the hole 41 of the second arc-shaped track 40, and another end of the return spring 95 is positioned on the screw 633 of the seat 60. The return spring 95 serves to push against the stop portion 63 of the sliding assembly H. The safety spring 92 is restricted in the support bracket 93 and the return spring 95, and the safety rod 90 is riveted to the support bracket 93. The safety rod 93 and the return spring 95 push the safety rod 90 to move, so as to close the safety oil passage 43 of the second arc-shaped track 40.

Figure 4:
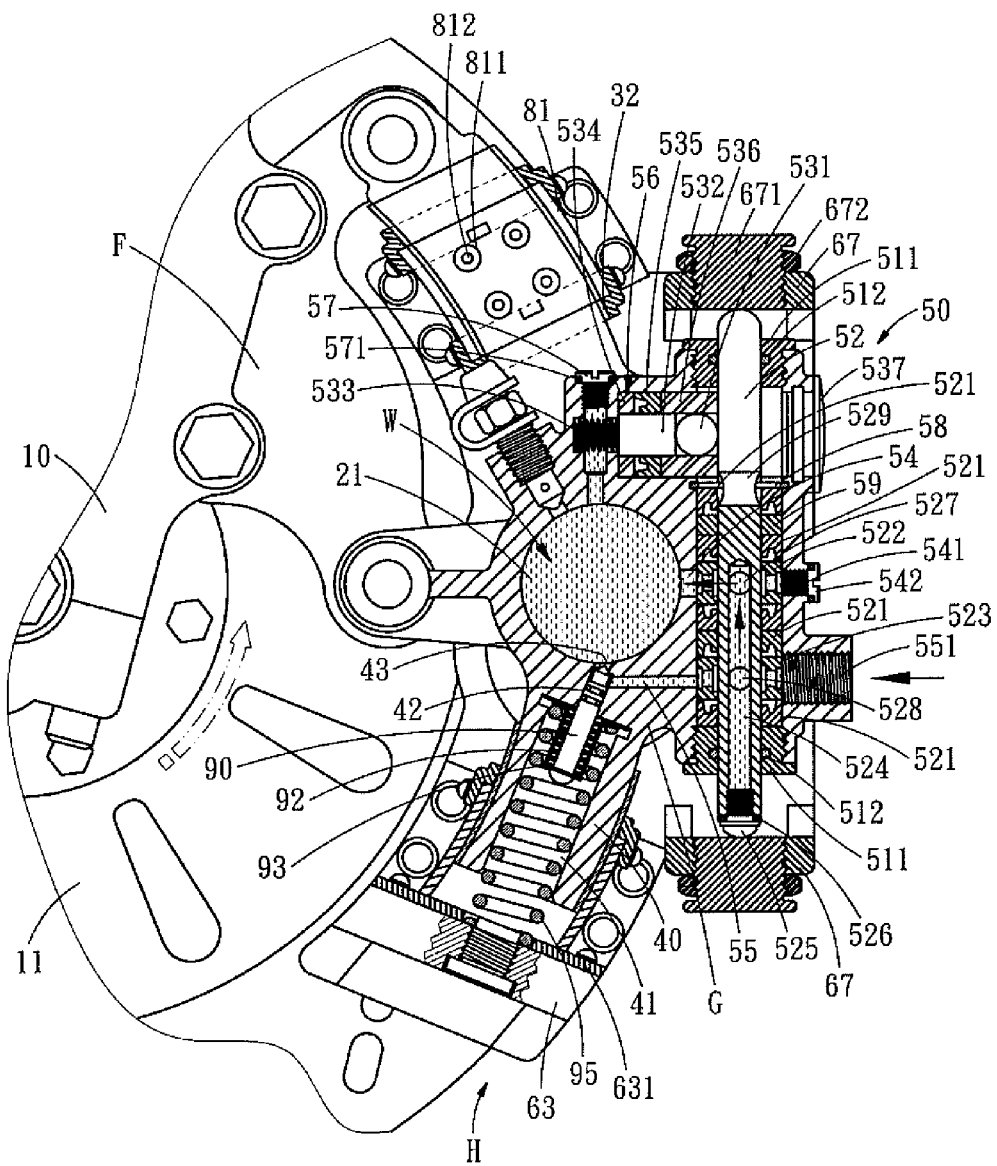
FIG. 4 is a first cross section operational view of showing the hydraulic disc brake device in accordance with the first embodiment of the present invention.

As shown in FIG. 4, before braking action is initiated, the brake disc 11 rotates counterclockwise along with the wheel, the front brake lining shoe 71 and the rear brake lining shoe 72 are located at both sides of the brake disc 11 in a pressure free manner. At this moment, since the return spring 95 is biased between the hole 41 of the second arc-shaped track 40 of the base assembly G and the anti-collision piece 631 of the sliding assembly H, the motionless base assembly G enables the sliding assembly H to be pushed by the return spring 95 to the lowest portion of the arc-shaped track. Accordingly, the two opposite abutting blocks 67 of the sliding assembly H are also located at the lowest portion of the arc-shaped track, and push the lower end of the control rod 52 of the control valve assembly 50 upward. Since the control rod 52 moves with respect to the control groove 51 of the control valve assembly 50, the control passage 524 of the control rod 52 will be aligned to the first oil hole 527, and the second oil hole 528 and the second oil ring 523 will exactly be aligned to the oil feeding hole 551. As a result, the oil W from the oil feeding hole 551 will flow to the oil chamber 21 via the second oil ring 523, the second oil hole 528, the control passage 524, the first oil hole 527, the first oil ring 522 and the main passage 54. However, before the oil W pressure increases, the piston 22 will not be driven by any oil pressure from the oil chamber 21.

On the other hand, the sliding assembly H doesn't move relative to the base assembly G, therefore, the front surface of the front brake lining shoe 71 is not pressed against the steel balls 26. At this moment, the brake lining assembly 70 doesn't clamp the brake disc 11, and the annular neck portion 529 of the control rod 52 is located below the pressure relief steel ball 531 of the pressure relief valve 53. Therefore, the wheel can rotate freely without any resistance.

Figure 5:
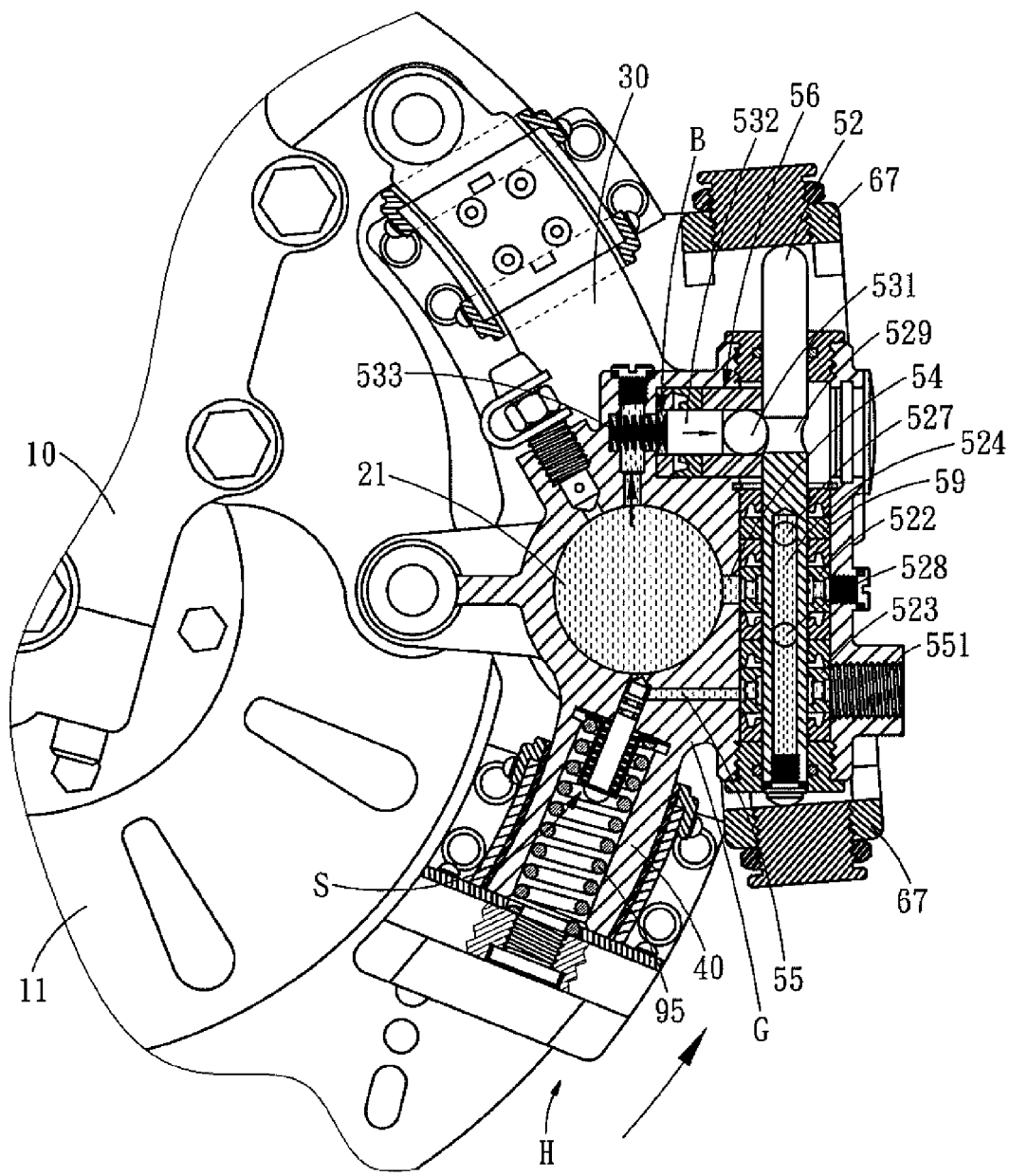
FIG. 5 is a second cross section operational view of showing the hydraulic disc brake device in accordance with the first embodiment of the present invention.

When the hydraulic disc brake device is activated at a relatively high speed, as both shown in FIGS. 4 and 5, the brake disc 11 still rotates counterclockwise, at this moment, the oil W increases in pressure and flows from the oil feeding hole 551 to the oil chamber 21 via the second oil ring 523, the second oil hole 528, the control passage 524, the first oil hole 527, the first oil ring 522 and the main passage 54 (as indicated by the arrow). Meanwhile, the piston 22 of the pressing assembly 20 is moved by the oil pressure from the oil chamber 21, pushing the front brake lining shoe 71 toward the rear brake lining shoe 72, as a result, the brake disc 11 is clamped firmly by the front and second brake lining shoes 71 and 72, causing an emergency braking action.

After that, as shown in FIG. 5, at the instant the braking action is initiated, the front and second brake lining shoes 71 and 72 absorb a lot of counterclockwise stress from the brake disc 11, generating a very large counterclockwise stress toward the center of the brake disc 11. Since the sliding assembly H is slideably disposed in the first and second arc-shaped tracks 30 and 40 of the base assembly Q the first and second arc-shaped tracks 30 and 40 are located opposite the center of the brake disc 11, plus the inertial force produced by an emergency of a high speed vehicle is larger than the critical value of the elastic force of the return spring 95 of the spring assembly S. The emergency-brake caused stress will push the sliding assembly H to slide counterclockwise while compressing the return spring 95 (as shown in FIG. 5).

At the same time, the counterclockwise motion of the slide assembly H causes a displacement of the slide assembly H relative to the base assembly G, and the abutting blocks 67 of the sliding assembly H push the control rod 52 of the control valve assembly 50 to move, so that the control groove 51 of the control valve assembly 50 changes with the upward movement of the control rod 52, and the first and second oil rings 522 and 523 are not aligned with the main passage 54 and the auxiliary passage 55 anymore. Therefore, the oil W stops flowing into the oil chamber 21. At this moment, the control rod 52 of the control valve assembly 50 moves upward, therefore, the annular neck portion 529 of the control rod 52 moves upward to a position aligned with the pressure relief steel ball 531. Under the effect of the pushing force of the spring 533 and the oil pressure of the oil chamber 21, the pin 532 pushes the pressure relief steel ball 531 into the annular neck portion 529 of the control rod 52, and as a result, a pressure relief oil space B appears at another end of the pin 532 facing the oil chamber 21. At this moment, the oil W will be decompressed instantly after flowing into the pressure relief oil space B, so that the piston 22 of the pressing device 20 reduces its pushing force on the front brake lining shoe 71, and accordingly, the brake lining assembly 70 relieves its clamping force against the brake disc 11. At this moment, the brake-caused counterclockwise stress disappears from the sliding assembly H, and the return spring 95 pushes the sliding assembly H back to its original position. Meanwhile, the sliding assembly H rotates about the base assembly G. The annular neck portion 529 of the control rod 52 moves downward (to disengage from the pressure relief steel ball 531 again), the pressure relief steel ball 531 pushes the pin 532 and the spring 533 backward, so that the pressure relief oil space B disappears. Meanwhile, the control groove 51 of the control valve assembly 50 changes with the downward movement of the control rod 52, and the first and second oil rings 522 and 523 are aligned with the main passage 54 and the auxiliary passage 55 again. Therefore, the oil W flows into the oil chamber 21 again (the pressure thereof increases again), and the brake lining assembly 70 instantly clamps the brake disc 11 again. Such instant clamping and instant relief actions will occur repeatedly, preventing the brake disc from being clamped too tight (antilock effect).

It is to be noted that a plurality of anti-collision structures are provided on the sliding assembly H and opposite the base assembly G, wear-resistance structures are arranged at the positions where the friction frequently occurs, and the present invention is also provided with a plurality of position adjustment structures.

Figure 6:
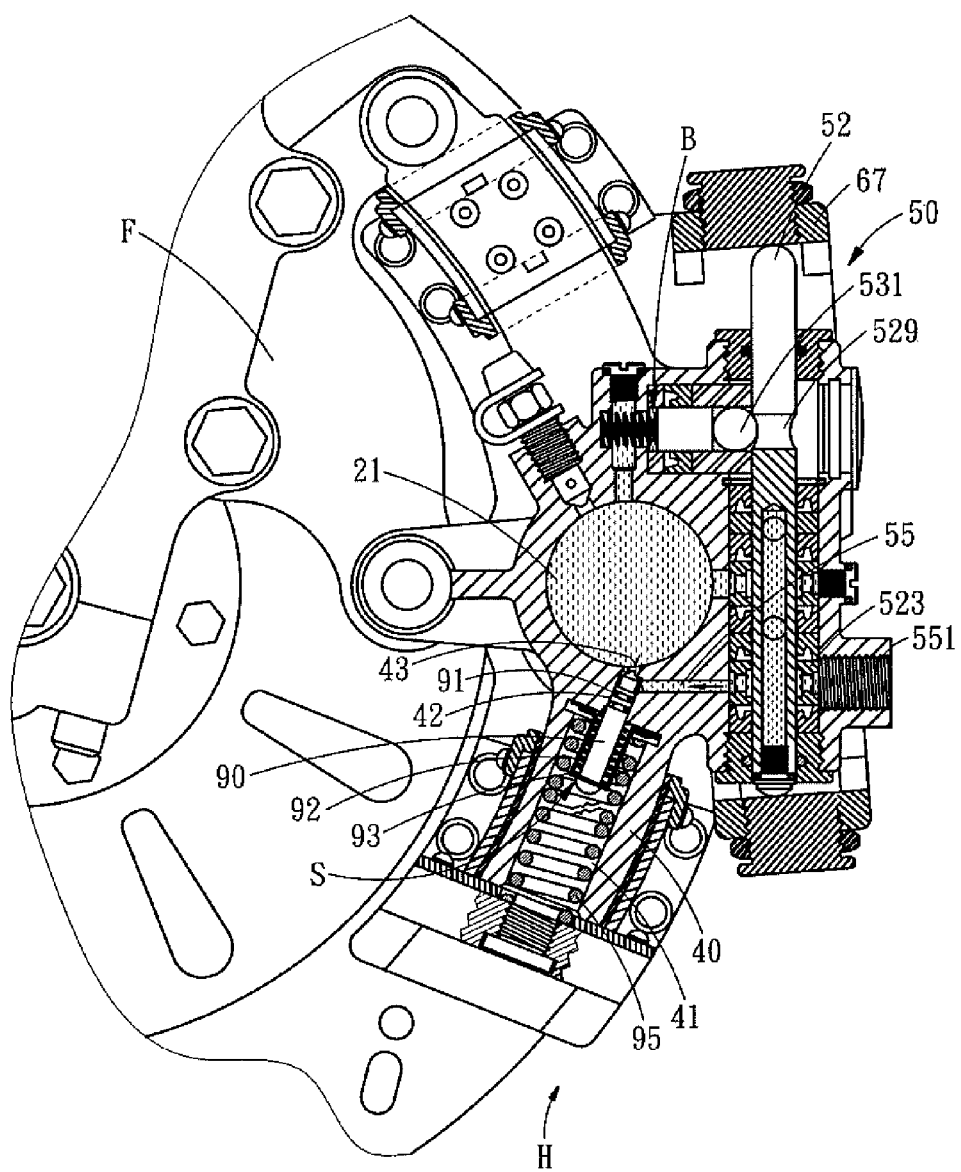
FIG. 6 is a third cross section operational view of showing the hydraulic disc brake device in accordance with the first embodiment of the present invention.
Figure 7:
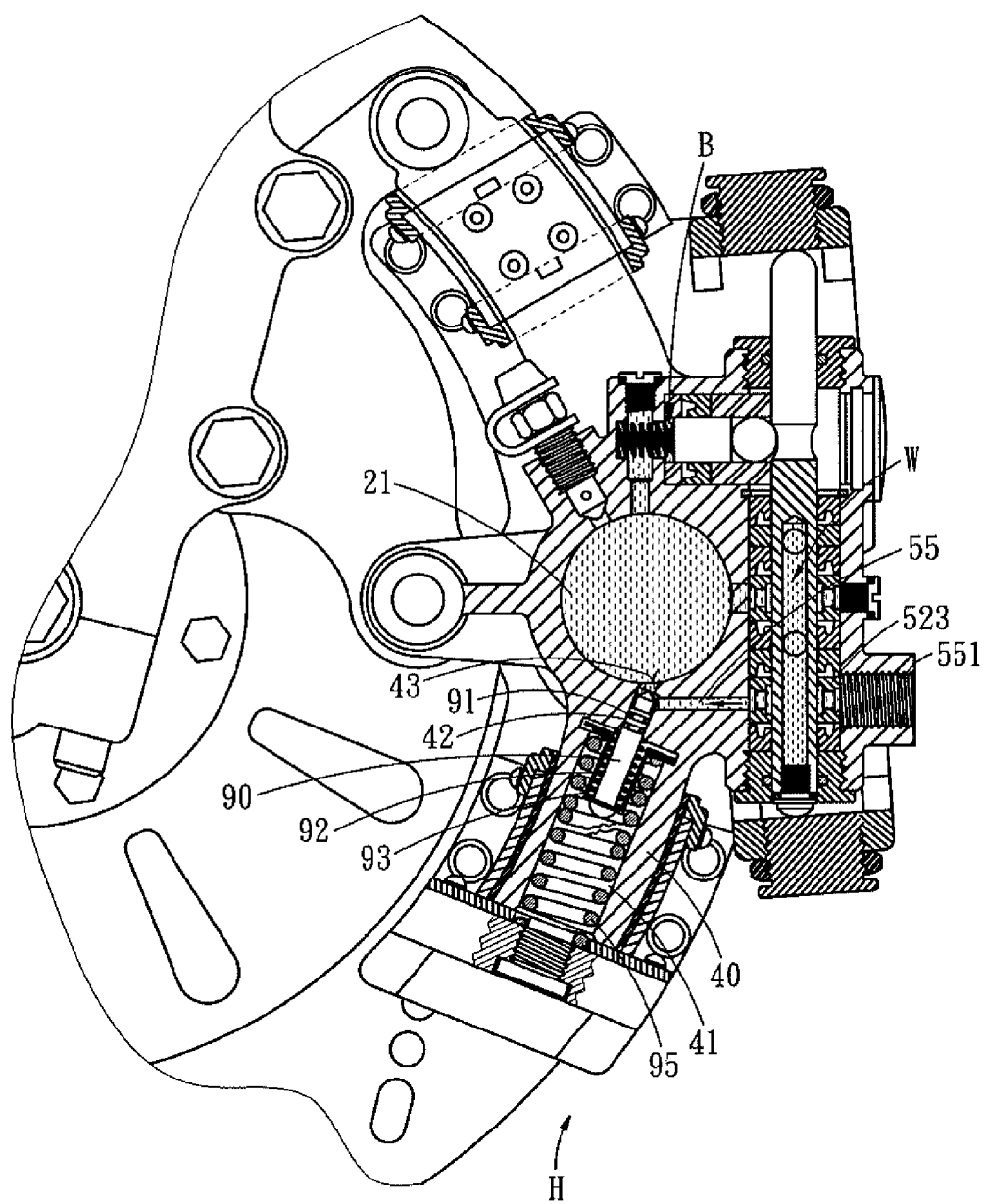
FIG. 7 is a fourth cross section operational view of showing the hydraulic disc brake device in accordance with the first embodiment of the present invention.

Referring then to FIGS. 6 and 7, aiming at the safety operation, the present invention is particularly provided with the safety rod 90, the safety spring 92 and the support bracket 93. If the return spring 95 is broken (as shown in FIG. 6), the support bracket 93 will not be pushed by the return spring 95 anymore but will be subjected to the pushing force of the safety spring 92. At this moment, the support bracket 93 will be deformed or will move downward, and the safety rod 90 will lose its supporting force since it is riveted to the support bracket 93. As a result, the end of the safety rod 90 doesn't seal the safety oil passage 43 of the second arc-shaped track 40 anymore. Meanwhile, the oil W from the oil feeding hole 551 flows into the safety oil passage 43 via the second oil ring 523 of the control valve assembly 50, and constantly increases the pressure of the oil chamber 21. Although the control rod 52 cooperates with the pressure relief steel ball 531 to produce a pressure relief oil space B, the oil from the safety oil passage 43 can still enable the brake lining assembly 70 to keep firmly pressing against the brake disc 11. Therefore, the emergency brake effect (only the antilock effect is lost) can still be ensured even if the return spring 95 is broken. Furthermore, if the return spring 95 fatigues, the safety rod 90, the safety spring 92 and the support bracket 93 can still produce the effect of emergency brake.

Figure 8:
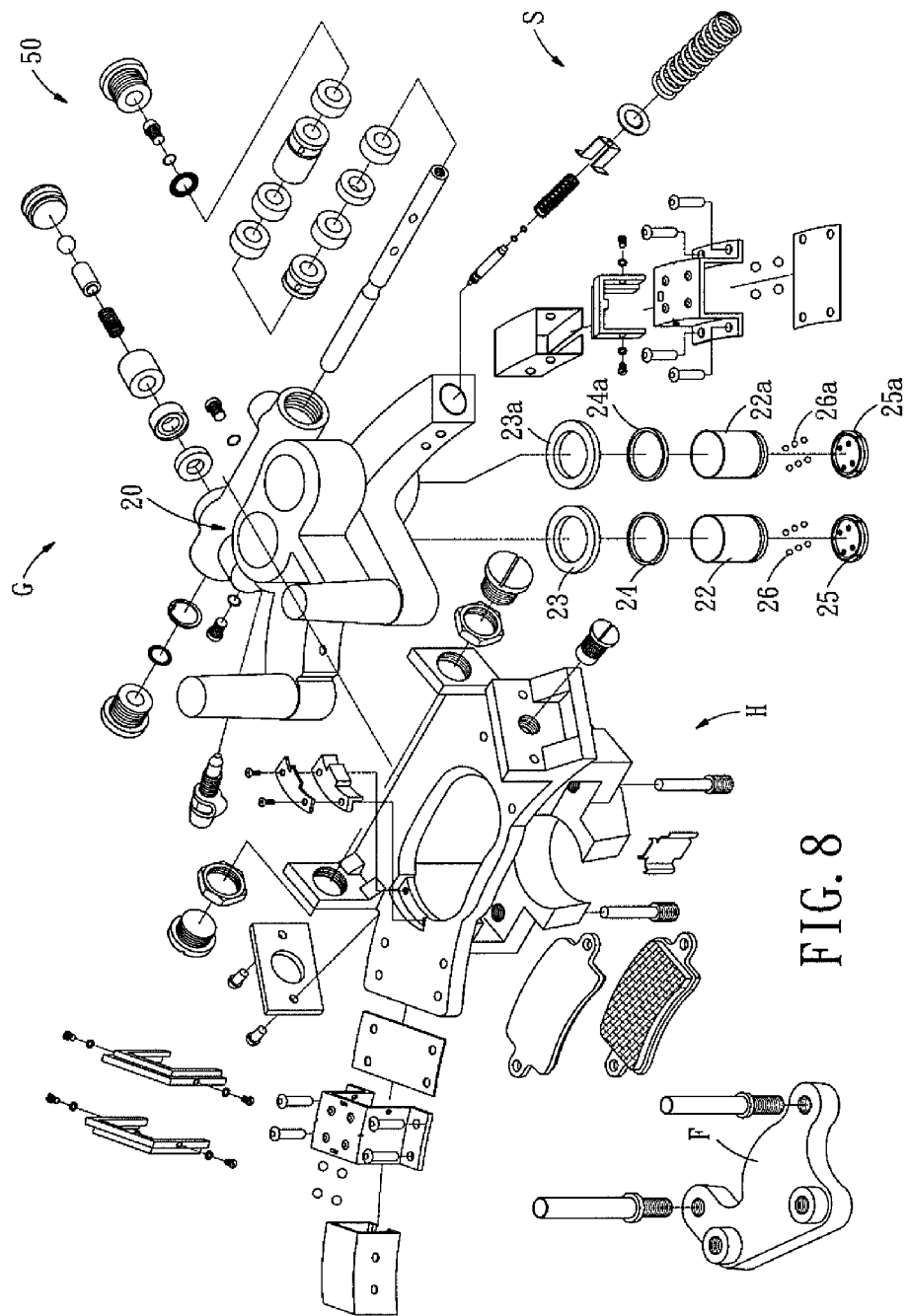
FIG. 8 is an exploded view of a hydraulic disc brake device in accordance with a second embodiment of the present invention.
Figure 9:
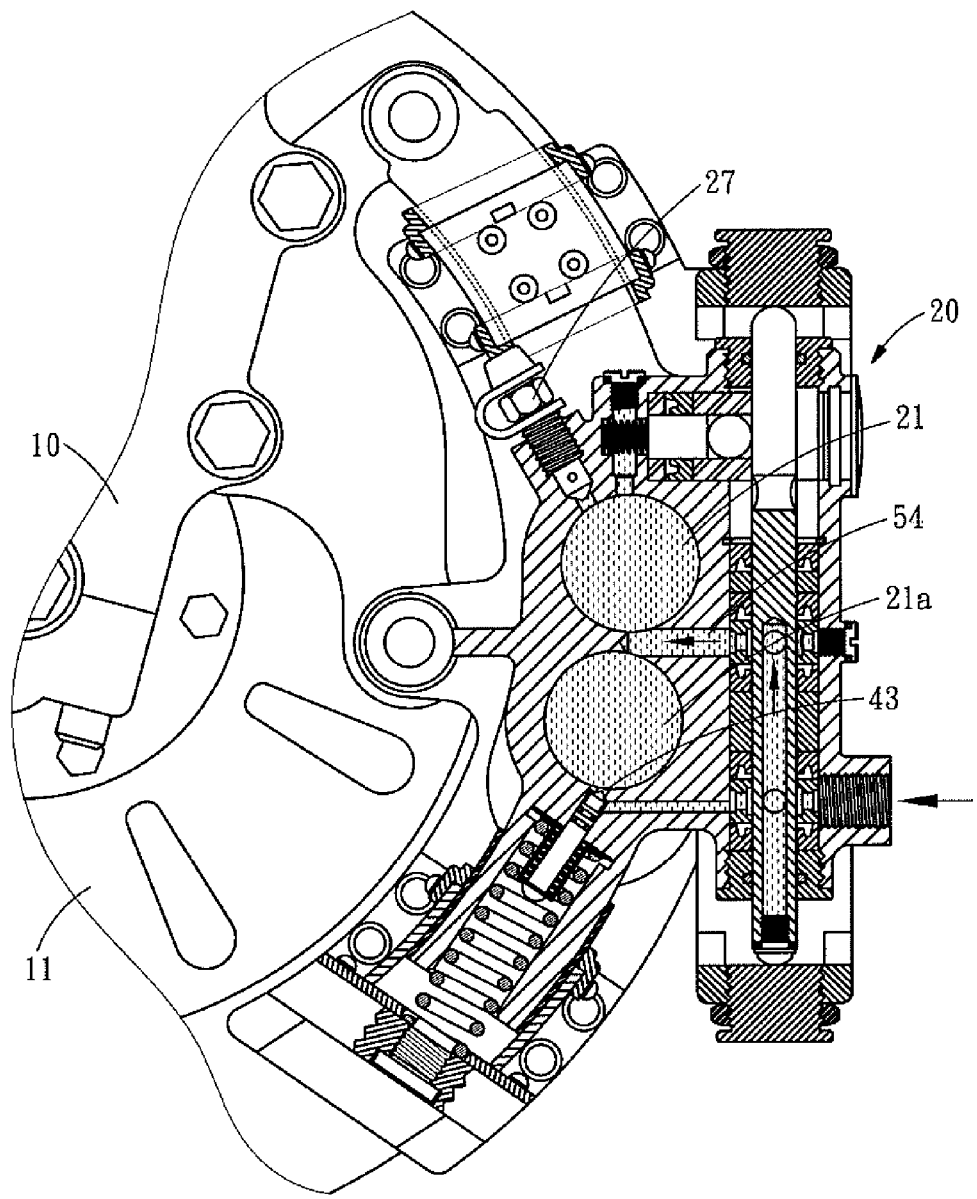
FIG. 9 is a cross section operational view of showing the hydraulic disc brake device in accordance with the second embodiment of the present invention.

Referring to FIGS. 8 and 9, which show a second embodiment. In this embodiment, there are two sets of oil chambers 21, pistons 22 and steel-ball positioning discs 25, and each set includes the oil seals 23, 23a, 24, 24a, steel-ball positioning discs 25, 25a, a plurality of steel balls 26, 26a, and pistons 22, 22a slideably sealed in two oil chambers 21, 21a. The two oil chambers 21 are in communication with each other via a main passage 54. An exhaust valve 27 is arranged beside the oil chamber 21, and a safety oil passage 43 is formed beside the oil chamber 21a. By using the double pressing devices 20, the resultant braking force will be more strong, and the antilock effect will be better.

Figure 10:
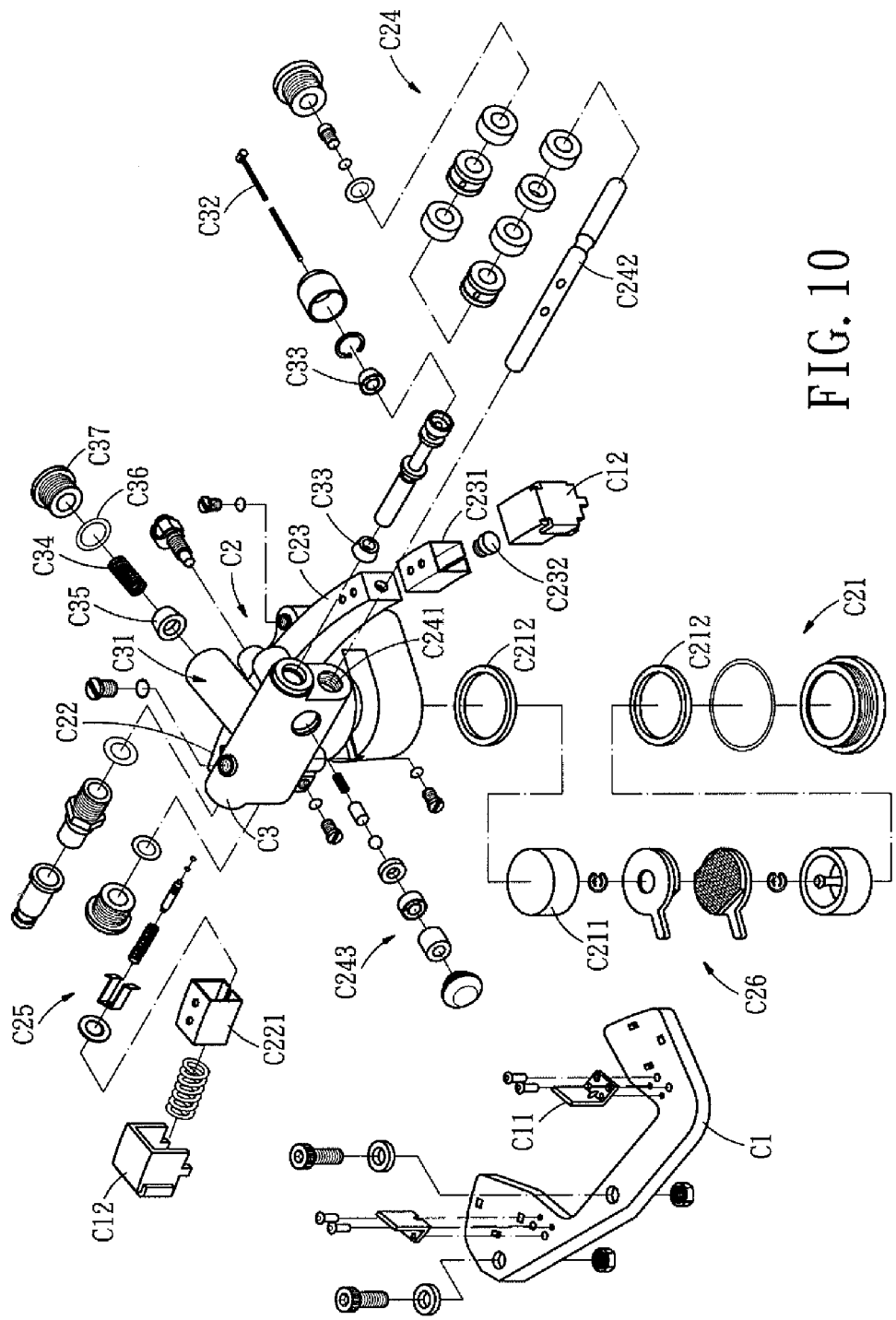
FIG. 10 is an exploded view of a hydraulic disc brake device in accordance with a third embodiment of the present invention.
Figure 11:
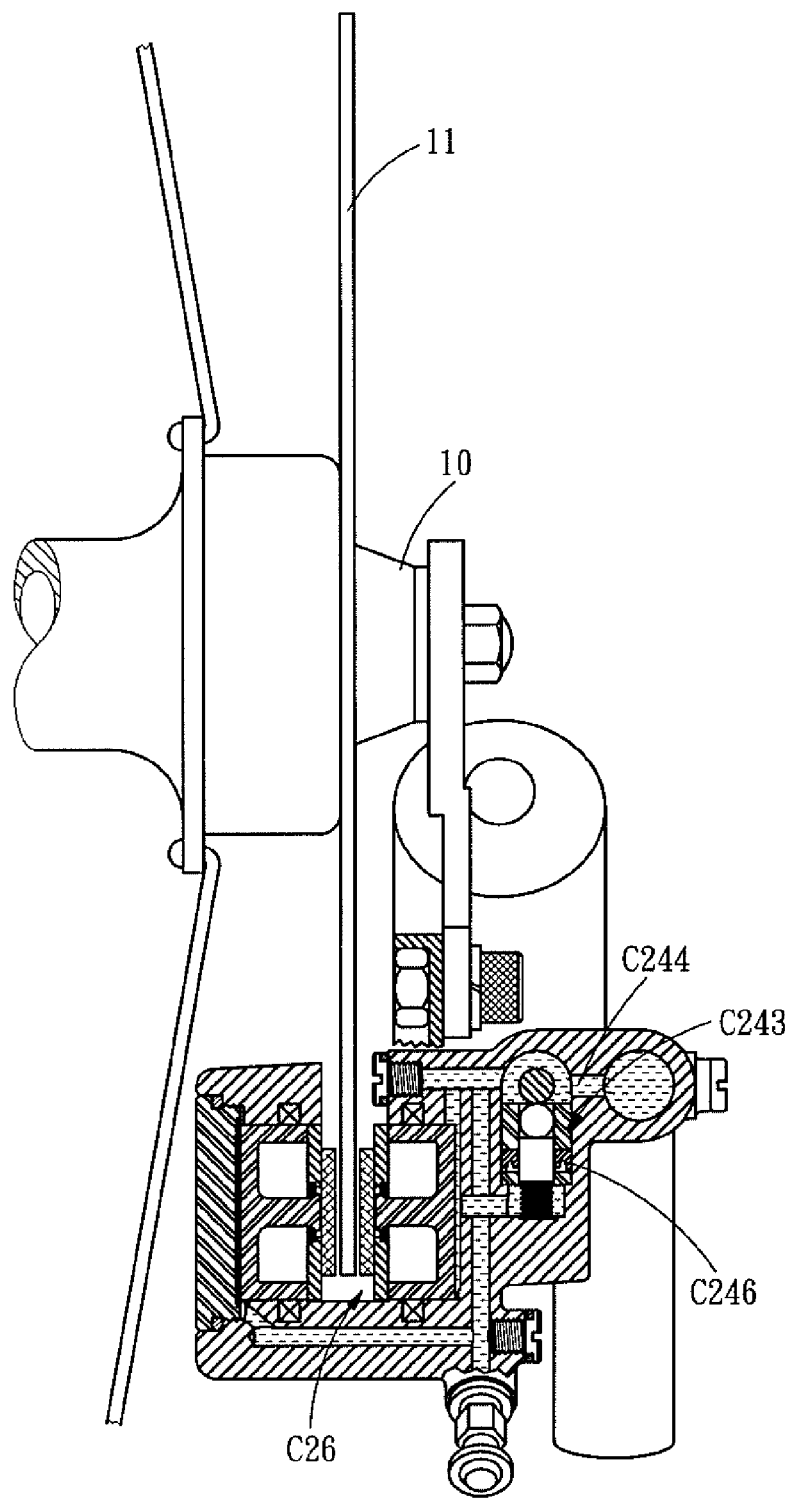
FIG. 11 is a first cross section view in accordance with the third embodiment of the present invention of showing the status of the hydraulic disc brake device before a brake action.
Figures 12, 13:
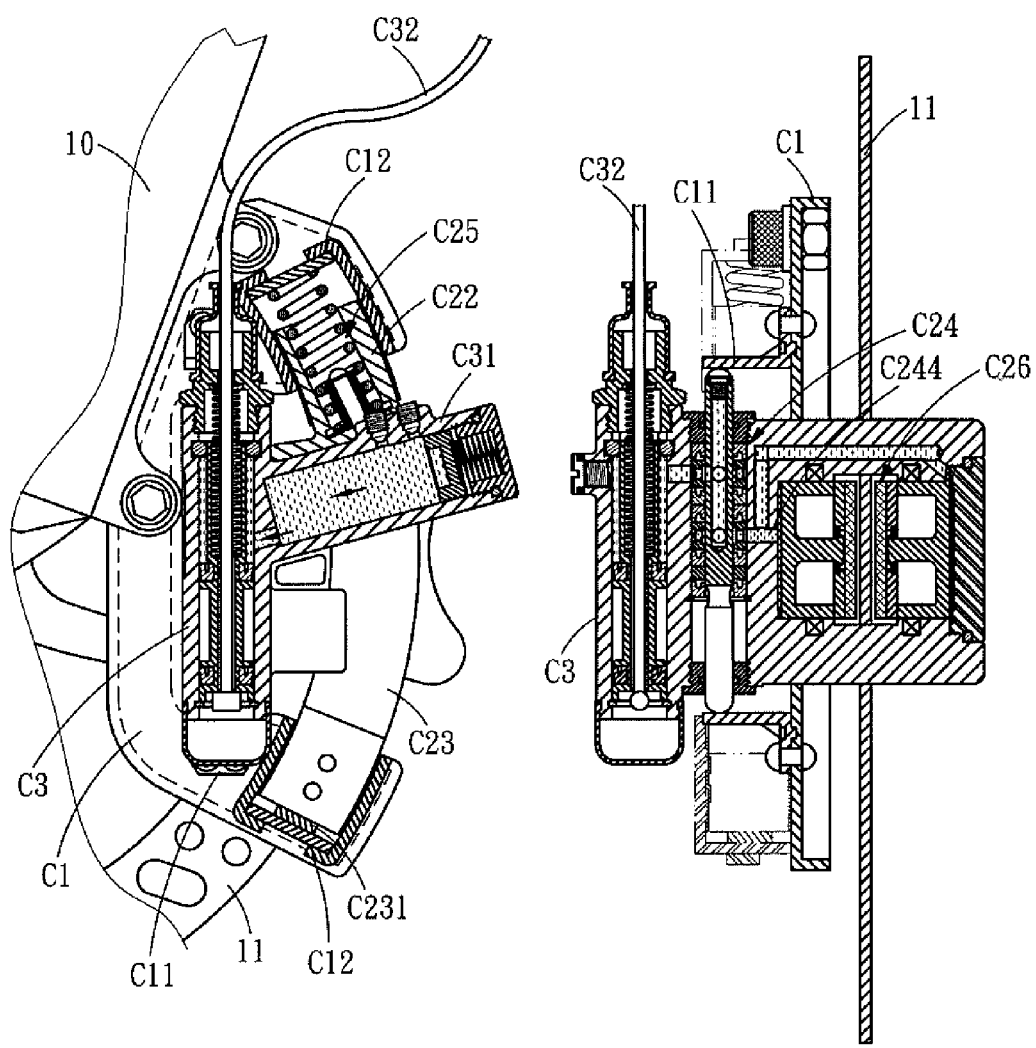
FIG. 12 is a second cross section view in accordance with the third embodiment of the present invention of showing the status of the hydraulic disc brake device before a brake action.
FIG. 13 is a third cross section view in accordance with the third embodiment of the present invention of showing the status of the hydraulic disc brake device before a brake action.
Figure 14:
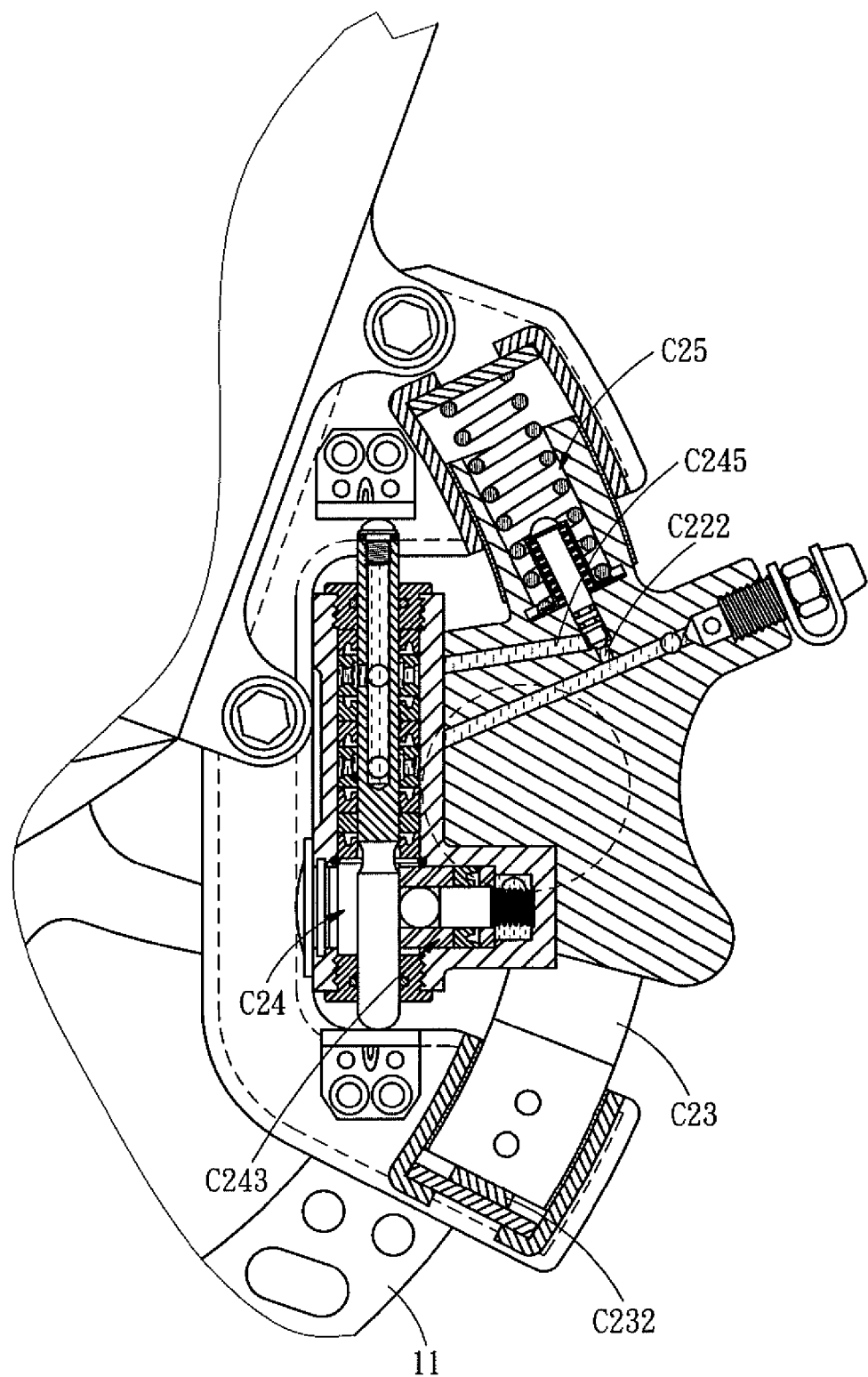
FIG. 14 is a fourth cross section view in accordance with the third embodiment of the present invention of showing the status of the hydraulic disc brake device before a brake action.
Figure 15:
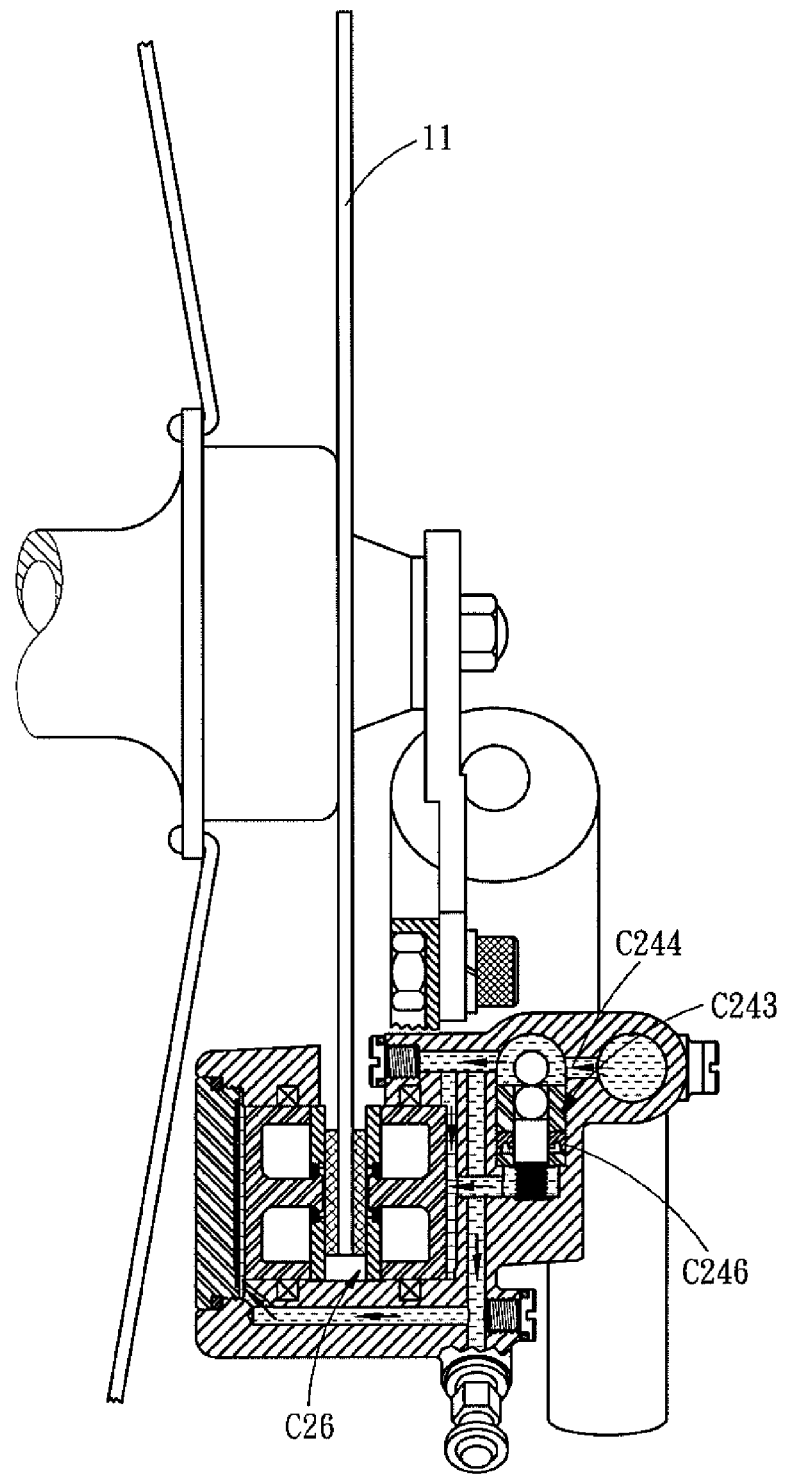
FIG. 15 is a first cross section view in accordance with the third embodiment of the present invention of showing the status of the hydraulic disc brake device during a brake action.
Figure 16:
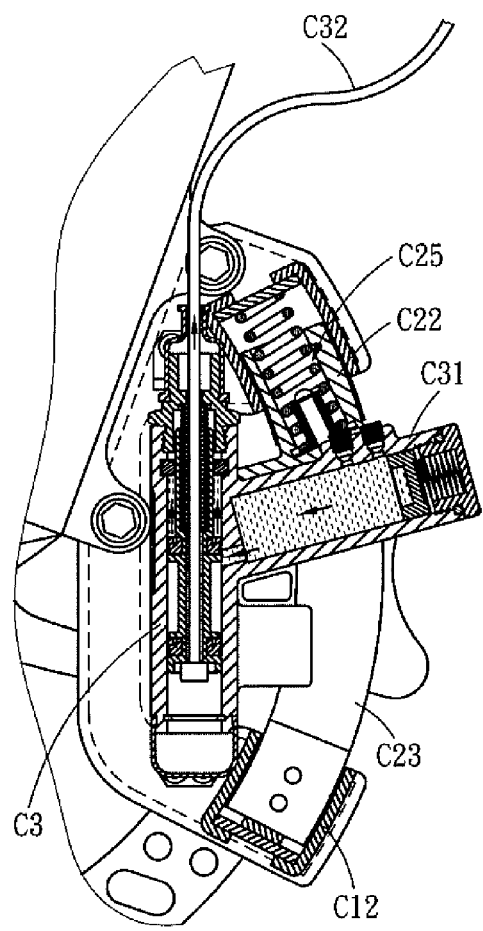
FIG. 16 is a second cross section view in accordance with the third embodiment of the present invention of showing the status of the hydraulic disc brake device during a brake action.
Figure 17:
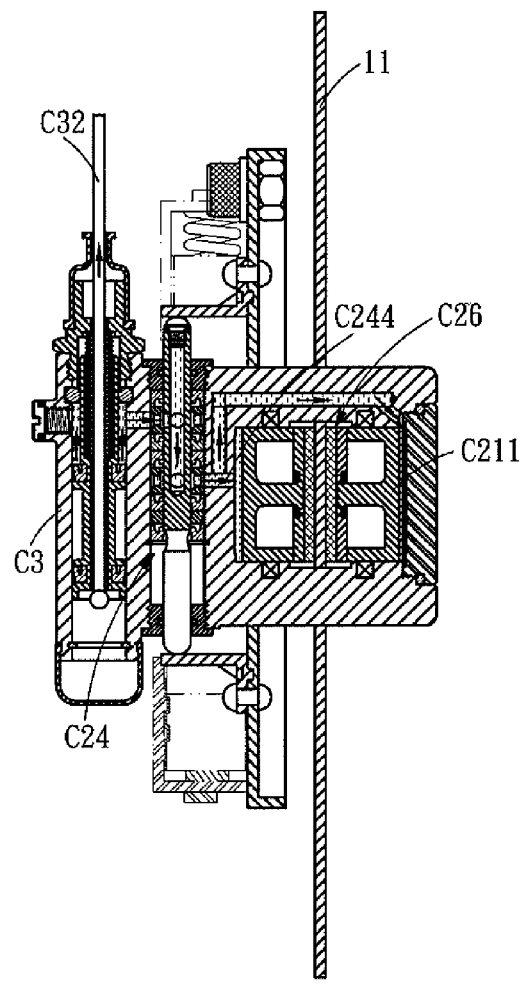
FIG. 17 is a third cross section view in accordance with the third embodiment of the present invention of showing the status of the hydraulic disc brake device during a brake action.
Figure 18:
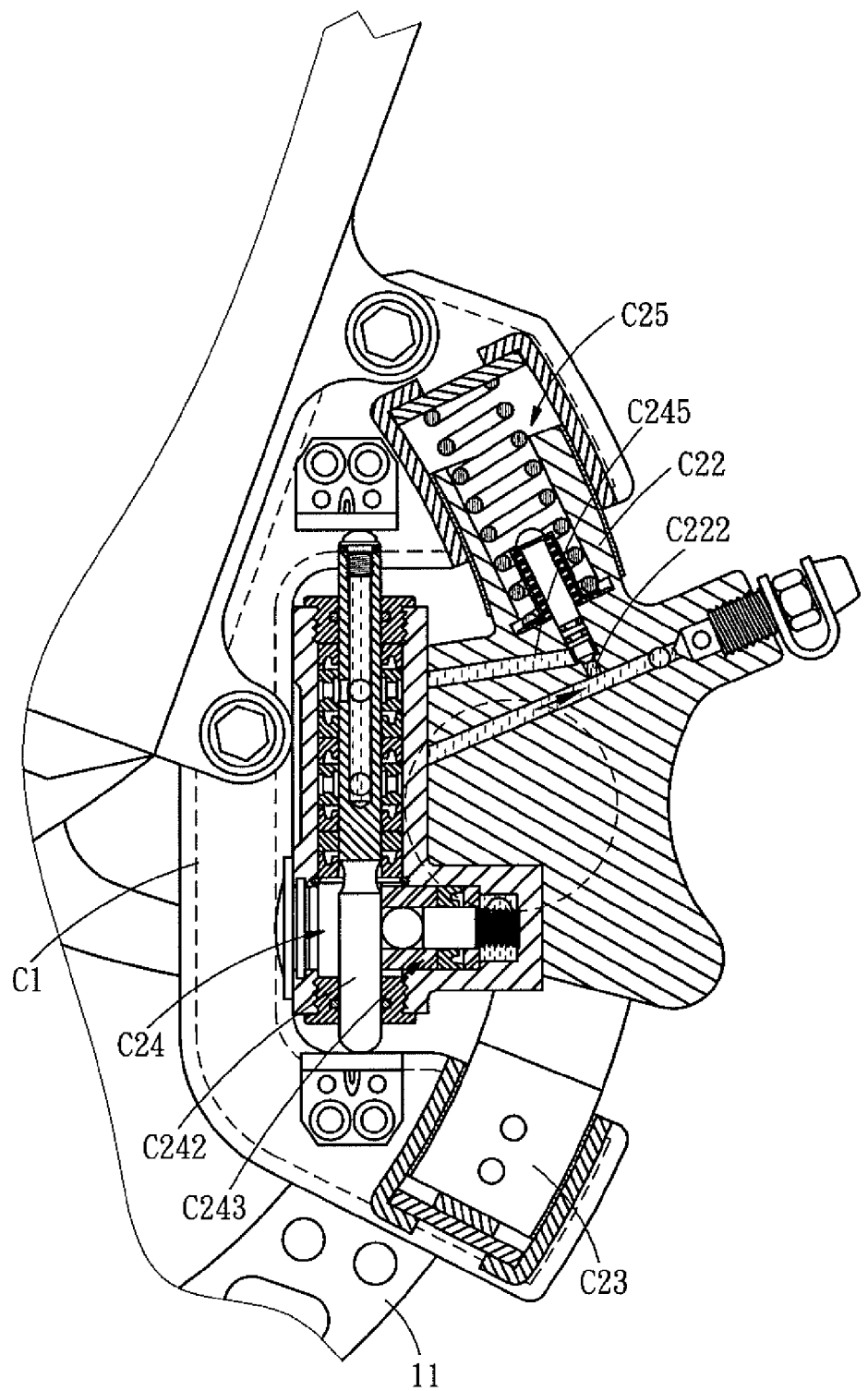
FIG. 18 is a fourth cross section view in accordance with the third embodiment of the present invention of showing the status of the hydraulic disc brake device during a brake action.
Figure 19:
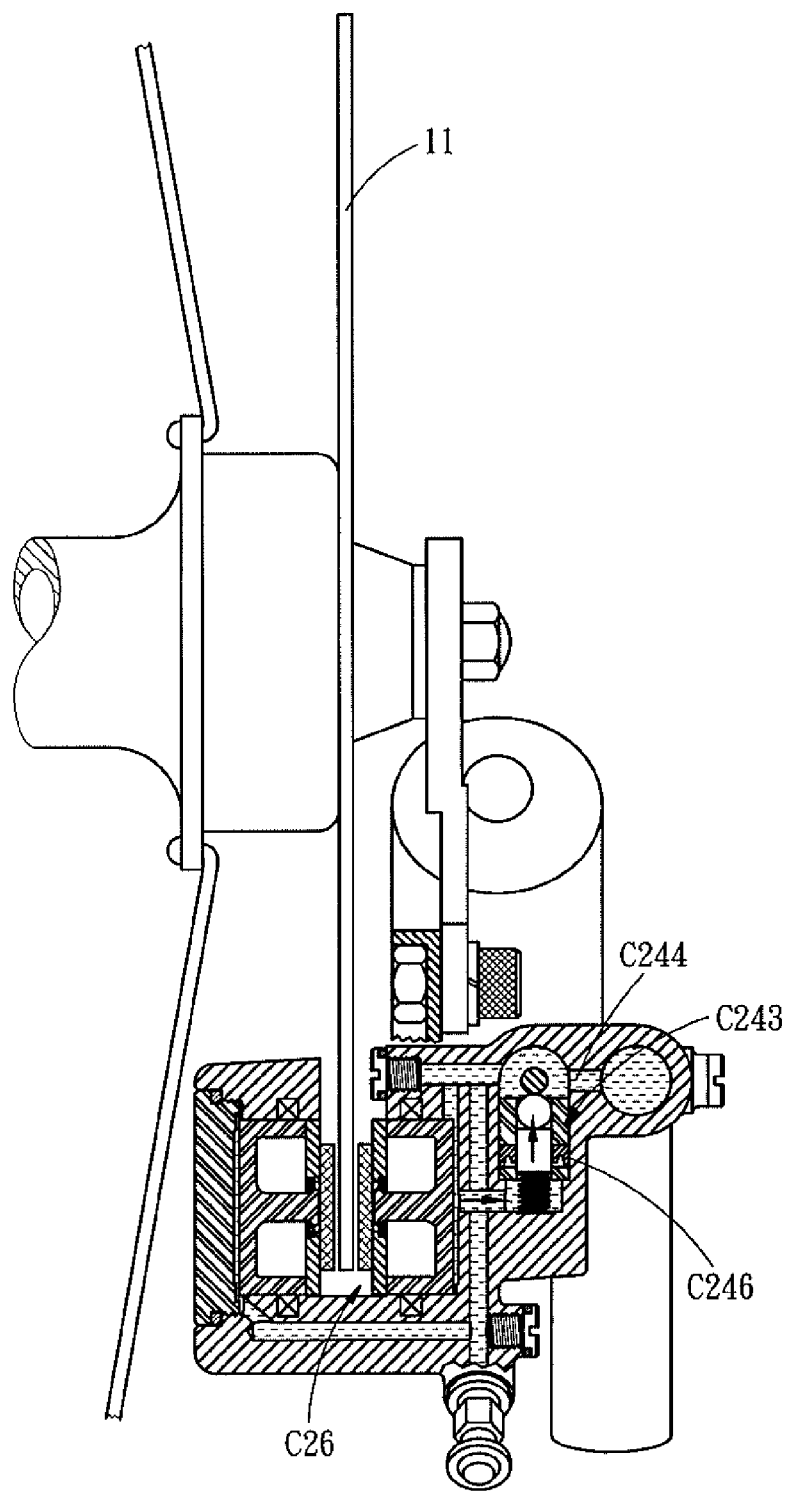
FIG. 19 is a first cross sectional view in accordance with the third embodiment of the present invention of showing the antilock action of the hydraulic disc brake device.
Figure 20:
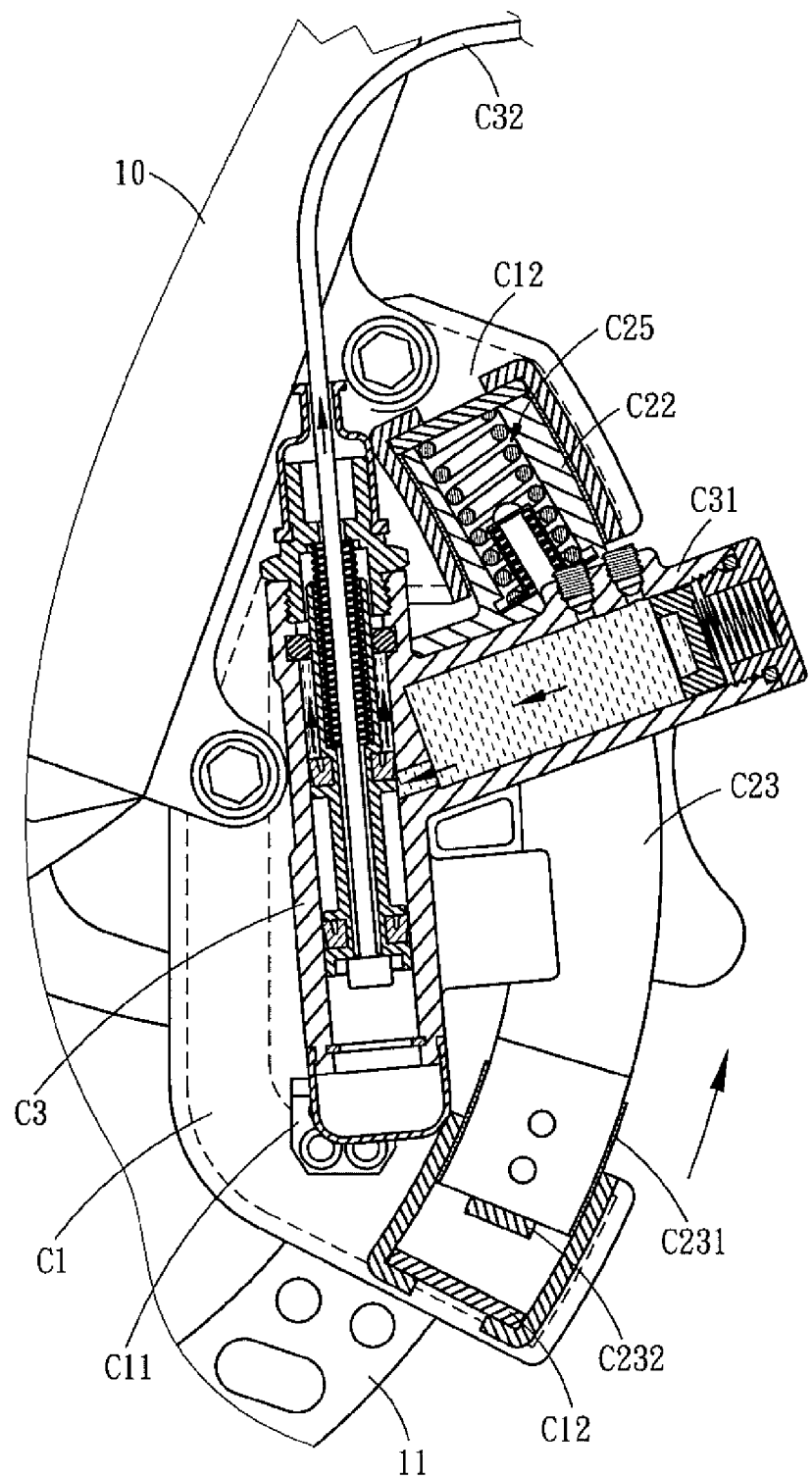
FIG. 20 is a second cross sectional view in accordance with the third embodiment of the present invention of showing the antilock action of the hydraulic disc brake device.
Figure 21:
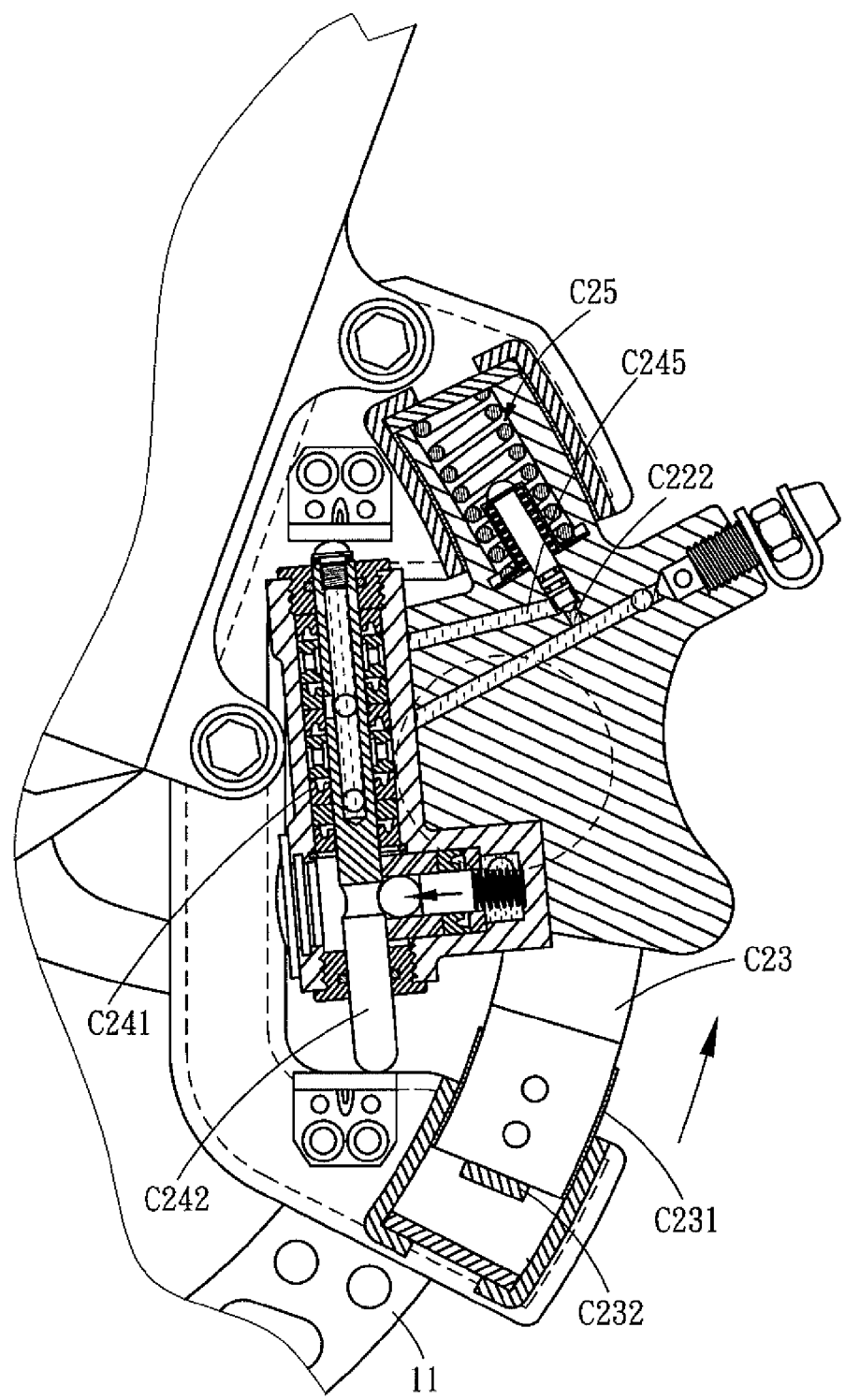
FIG. 21 is a third cross sectional view in accordance with the third embodiment of the present invention of showing the antilock action of the hydraulic disc brake device.

FIG. 10 shows a third embodiment of the present invention, this embodiment is additionally provided with a main cylinder C3 and an elastic oil-storage cylinder C31. The seat C1 is installed on the wheel carrier 10 and serves to cooperate with the moveable base assembly C2. The status of the hydraulic disc brake device before braking action is shown in FIGS. 11-14, the status of the hydraulic disc brake device during braking action is shown in FIGS. 15-18, and the status of the hydraulic disc brake device during antilock action is shown in FIGS. 19-21.

The seat C1 is fixed onto the wheel carrier 10, a L-shaped stop board C11 is riveted to either side of the seat C1, and a space is defined between the two L-shaped stop boards C11. The two L-shaped stop boards C11 are located in the arc-shaped route of the wheel axis. Two sliding members C12 with opening facing each other are disposed in the arc-shaped route of the wheel axis, and each of the sliding members C12 is a structure with one end closed and with an interior receiving space.

The base assembly C2 includes a pressing device C21, a first arc-shaped track C22, a second arc-shaped track C23, a control valve assembly C24, a spring-assembly C25, the main cylinder C3 and the elastic oil-storage cylinder C31.

The spring assembly C25 is confined in the first arc-shaped track C22 by the sliding assembly C12, and includes a safety rod, two seal rings, a safety spring, a support bracket, a washer and a return spring. One end of the return spring cooperating with the washer and the support bracket is pressed against the bottom edge of the first arc-shaped track, and another end of the return spring is pressed against the sliding members C12 of the seat C1. The safety spring is restricted in the support bracket and the return spring, and the safety rod is riveted to the support bracket.

The pressing device C21 includes a piston C211, and a plurality of oil seals C212. Since the pressing device C21 moves along with the base assembly C2 and the braking lining assembly C26, it doesn't need the steel balls and the steel-ball positioning disc, and it can use the conventional pressing device to cooperate with the brake lining assembly C26, and the brake lining assembly C26 is pressed to clamp the brake disc 11.

The first and second arc-shaped tracks C22 and C23 are also provided with the wear-resistance covers C221, C231, the sling members C12 are slideably installed on the first and second arc-shaped tracks C22 and C23. An antic-collision cushion C232 is disposed at the end of the second arc-shaped track C23, and the first arc-shaped track C22 is interiorly formed with safety oil passage. The end of the safety rod of the spring assembly C25 is pushed by the return spring to close the safety oil passage.

The assembly, function and effect of the control valve assembly C24 are similar to the previous embodiment, and the only difference is that the position and the structure of the oil route are changed appropriately.

It is to be noted that the main cylinder C3 and the elastic oil-storage cylinder C31 are installed on the base assembly C2 directly. The main cylinder C3 utilizes a steel cord C32 to drive the main piston C33, so as to push the oil into the oil chamber. A pushing spring C34, an O-shaped ring C36, and a piston C35 are sealed in the elastic oil-storage cylinder C31 by a cover C37. The pushing spring C34 pushes the piston C35 to move, so as to push the oil into the main cylinder C3, and the oil pressure of the main cylinder C3 is directly connected to the control valve assembly C24.

In this embodiment, the seat C1 is mounted on the wheel carrier 10.

The main cylinder can also be mounted on the handlebar.

While we have shown and described various embodiments in accordance with the present invention, it is clear to those skilled in the art that further embodiments may be made without departing from the scope of the present invention.

What is claimed is:

1. A hydraulic disc brake device used in a brake system of a vehicle, comprising:
    a base assembly mounted on the vehicle;
    a sliding assembly slideably mounted on the base assembly and moveable along a predetermined arc;
    a return spring disposed between the base assembly and the sliding assembly, a relative motion between the base assembly and the sliding assembly can cause a compression of the return spring;
    a brake lining assembly employed to clamp a brake disc and controlled by oil pressure of an oil pressure system of the vehicle;
    a control valve assembly disposed on the oil pressure system for controlling the oil pressure of the oil pressure system, wherein an inertial force acted on the brake lining assembly in the case of a brake action will cause the sliding assembly to move along the predetermined arc with respect to the base assembly, the relative movement between the sliding assembly and the base assembly will cause compression of the return spring and make the control valve assembly stop increasing the oil pressure, then the control valve assembly produces a press relief oil space in the base assembly, after the brake lining assembly releases the brake disc, the return spring will close the pressure relief oil space again, thus increasing the oil pressure again, allowing the brake lining assembly to clamp and release the brake disc repeatedly.

2. The hydraulic disc brake device as claimed in claim 1, wherein the base assembly is installed on a wheel carrier of the vehicle and includes a first arc-shaped track and a second arc-shaped track, the control assembly is disposed in the base assembly, and the sliding assembly is slideably disposed on the first and second arc-shaped tracks of the base assembly.

3. The hydraulic disc brake device as claimed in claim 2, wherein:
    the first arc-shaped is located correspondingly to a center of the brake disc, the second arc-shaped track is located correspondingly to the center of the brake disc and is formed with a hole along its length;
    the sliding assembly includes a seat, the brake lining assembly and a sliding device, a brake space is defined in the seat for accommodation of the brake disc and the brake lining assembly, the sliding device is installed on the seat, and the first and second arc-shaped track are to be slideably mounted on the sliding device.

4. The hydraulic disc brake device as claimed in claim 2, wherein the base assembly is fixed on the wheel carrier by a positioning board which is mounted on the wheel carrier by screws, and a plurality of positioning bolts is screwed on opposite sides of the positioning board, a positioning arm protrudes from a side of the pressing device and is to be positioned on one of the positioning bolts by a positioning sleeve, one end of the first arc-shaped track is positioned on the other one of the positioning bolts by a positioning sleeve.

5. The hydraulic disc brake device as claimed in claim 2, wherein the first and second arc-shaped tracks are located correspondingly to the center of the brake disc.

6. The hydraulic disc brake device as claimed in claim 3, wherein the base assembly is formed with a flange and includes a pressing device, the pressing device includes a piston moveably sealed in an oil chamber, the oil pressure of the oil chamber serves to push the piston, a safety oil passage is formed in a bottom of the hole of the second arc-shaped track and is in communication with the oil chamber of the pressing device;

an elliptical sliding hole is formed in the center of the seat of the sliding assembly for passage of the piston of the pressing device and the flange of the base assembly, a brake-mounting portion protrudes from the elliptical sliding hole of the seat, the brake space is defined between the brake-mounting portion and the elliptical sliding hole; and the brake lining assembly includes a front brake lining shoe and a rear brake lining shoe that are installed on the seat in a parallel manner, a front surface of the front brake lining shoe is pressed against the piston of the pressing device.

7. The hydraulic disc brake device as claimed in claim 3, wherein:

a safety oil passage is formed in a bottom of the hole of the second arc-shaped track and is in communication with the oil chamber of the pressing device;

a stop portion is formed on the seat of the sliding assembly and is located correspondingly to the second arc-shaped track of the base assembly;

the return spring is biased between a bottom of the hole of the second arc-shaped track of the base assembly and the stopping portion of the sliding assembly.

8. The hydraulic disc brake device as claimed in claim 3, wherein the sliding device includes inverted U-shaped seats, dust-proof frames and wear-resistance pieces assembled together by screws, the inverted U-shaped seats are fixed on the seat by rivets, the inverted U-shaped seats are slideably mounted on the first and second arc-shaped tracks.

9. The hydraulic disc brake device as claimed in claim 6, wherein a stepped recess is formed at a side of the elliptical sliding hole, and an anti-collision block is fixed in the stepped recess by screws for preventing the flange of the base assembly from impact.

10. The hydraulic disc brake device as claimed in claim 6, wherein two brake-lining positioning shafts are fixed in a brake space of the seat of the sliding assembly and are located at both sides of the elliptical sliding hole, a front brake lining shoe and a rear brake lining shoe of the brake lining assembly are inserted on the two brake-lining positioning shafts.

11. The hydraulic disc brake device as claimed in claim 6, wherein the brake-mounting portion is provided with an engaging rib located in the brake space, a pressing spring leaf is disposed against a side of the front brake lining shoe and the rear brake lining shoe and is positioned on the engaging rib of the brake-mounting portion of the seat, thus preventing the front brake lining shoe and the rear brake lining shoe from becoming loose.

12. The hydraulic disc brake device as claimed in claim 6, wherein the pressing device includes the oil chamber, the piston, oil seals, a steel-ball positioning disc and a plurality of steel balls, the piston is moveably sealed in the oil chamber by the oil seals, the steel-ball positioning disc is positioned at an end of the piston, the plurality of steel balls is positioned between the steel-ball positioning disc and the piston, a plurality of through holes is defined in the steel-ball positioning disc, and the respective steel balls partially protrude from the through holes;

the front surface of the front brake lining shoe is pressed against the steel balls on the steel ball positioning disc of the piston of the pressing device, and can move smoothly under the aid of the steel balls protruding from the steel ball positioning disc.

13. The hydraulic disc brake device as claimed in claim 7, wherein the seat includes a second positioning portion located correspondingly to the second arc-shaped track of the base assembly, the stop portion is formed at the end of the second positioning portion, an anti-collision piece is fixed on the stop portion by screws, and a screw is disposed at the center of the stop portion and the anti-collision piece.

14. The hydraulic disc brake device as claimed in claim 7, wherein:

the control valve assembly includes a control groove, a control rod, a relief valve, a main passage, an auxiliary passage and a pressure relief space, the control groove is located adjacent to the oil chamber of the pressing device, a guide cover with a central hole is disposed at either side of the control groove, both ends of the control rod are protruded out of the center hole of the guide cover, the control groove is connected to the oil chamber of the pressing assembly via the main passage and the pressure relief space;

the auxiliary passage is connected to the safety oil passage of the second arc-shaped track;

the relief valve includes a pressure relief steel ball, a pin and a spring disposed in the pressure relief space, respectively, the pin is to be pressed by the spring and the oil pressure of the oil chamber, the pressure relief steel ball is located in the control groove, and the pin is slideably sealed between the oil chamber and the control groove;

a first oil ring and a second oil ring are positioned in a mid section of the control groove, the first and second oil rings each is formed with an open guiding structure, the first oil ring is located correspondingly to the main passage, and the second oil ring is located correspondingly to the auxiliary passage, the control rod is inserted in the control groove, the control rod is formed with a control passage, a first oil hole and a second oil hole are formed in the control passage and are located correspondingly to the first oil ring and the second oil ring, respectively, an annular neck portion is formed on the control rod and is located correspondingly to the pressure relief space, and the pressure relief steel ball of the pressure relief valve is to be engaged in and disengaged from the annular neck portion, when the pressure relief steel ball moves into the annular neck portion, a pressure relief oil space will appear at another end of the pin opposite the pressure relief steel ball 15. The hydraulic disc brake device as claimed in claim 8, wherein a plurality of cavities with steel balls are formed in the respective inverted U-shaped seats, and the steel balls are located between the inverted U-shaped seat and the first and second arc-shaped tracks, the respective dust-proof frames are fixed to the inverted U-shaped seats by screws, so as to enable the steel balls and the inverted U-shaped seats to slide smoothly and stably.

16. The hydraulic disc brake device as claimed in claim 13 further comprises a spring assembly confined in the hole of the second arc-shaped track by the stop portion of the sliding assembly, the spring assembly includes a return spring.

17. The hydraulic disc brake device as claimed in claim 14, wherein a guide cover having a central hole and a dust-proof ring is screwed to either side of the control groove, both ends of the control rod are protruded out of the center hole of the two guide covers.

18. The hydraulic disc brake device as claimed in claim 14, wherein a plurality of oil seals, the first oil ring and the second oil ring are positioned in the mid section of the control groove by a C ring.

19. The hydraulic disc brake device as claimed in claim 16, wherein the spring assembly includes a safety rod, a safety spring, a support bracket, and a return spring, the return spring cooperating with the support bracket is pressed against the bottom of the hole of the second arc-shaped track, and another end of the return spring is pressed against the stop portion of the sliding assembly, the safety spring is restricted in the support bracket, and the safety rod is disposed in the support bracket, the safety rod and the return spring push the safety rod to move, so as to close the safety oil passage of the second arc-shaped track.

20. A hydraulic disc brake device used in a brake system of a vehicle, comprising:
    a seat being mounted on a wheel carriage of the vehicle, and having two sliding members disposed in a predetermined arc-shaped route,
    a base assembly slideably mounted in the sliding members of the seat;
    a return spring disposed between the base assembly and the sliding assembly, a relative motion between the base assembly and the sliding assembly can cause a compression of the return spring;
    a brake lining assembly employed to clamp a brake disc and controlled by oil pressure of an oil pressure system of the vehicle;
    a control valve assembly disposed on the oil pressure system for controlling the oil pressure of the oil pressure system, wherein an inertial force acted on the brake lining assembly in the case of a brake action will cause the sliding assembly to move along the predetermined arc with respect to the base assembly, the relative movement between the sliding assembly and the base assembly will compress the return spring and make the control valve assembly stop increasing the oil pressure, then the control valve assembly opens a press relief oil space in the base assembly, after the brake lining assembly releases the brake disc, the return spring will close the pressure relief oil space again, thus increasing the oil pressure again, allowing the brake lining assembly to clamp and release the brake disc repeatedly.

21. The hydraulic disc brake device as claimed in claim 20, wherein two sliding members are mounted on the wheel carriage of the vehicle.

22. The hydraulic disc brake device as claimed in claim 20, wherein the base assembly includes a pressing device, a first arc-shaped track and a second arc-shaped track, the pressing device is pushed by pressure of a main cylinder, the first arc-shaped track is slideably disposed in the seat and is provided with spring assembly and a safety oil passage, the second arc-shaped track is slideably disposed in the seat.

23. The hydraulic disc brake device as claimed in claim 20, wherein the return spring is biased between the base assembly and the sliding members of the seat.

24. The hydraulic disc brake device as claimed in claim 20, wherein the brake lining assembly includes a front brake lining shoe and a rear brake lining shoe that are installed in the seat, a front surface of the front and rear brake lining shoes are pressed against the piston of the pressing device.

25. The hydraulic disc brake device as claimed in claim 20, wherein the control valve assembly includes a control groove, a control rod, a relief valve, a main passage, an auxiliary passage and a pressure relief space, the control groove is located adjacent to the oil chamber of the pressing device, a guide cover with a central hole is disposed at either side of the control groove, both ends of the control rod are protruded out of the center hole of the guide cover, the control groove is connected to the oil chamber of the pressing assembly via the main passage and the pressure relief space;
    the auxiliary passage is connected to the safety oil passage of the first arc-shaped track, an oil feeding hole located opposite the auxiliary passage;
    a first oil ring and a second oil ring are positioned in a mid section of the control groove, the first and second oil rings each is formed with an open guiding structure, the first oil ring is located correspondingly to the main passage, and the second oil ring is located correspondingly to the auxiliary passage, the control rod is formed with a control passage, a first oil hole and a second oil hole are formed in the control passage and are located correspondingly to the first oil ring and the second oil ring, respectively, an annular neck portion is formed on the control rod and is located correspondingly to the pressure relief space, and the pressure relief steel ball of the pressure relief valve is to be engaged in and disengaged from the annular neck portion, when the pressure relief steel ball moves into the annular neck portion, a pressure relief oil space will appear at another end of the pin opposite the pressure relief steel ball.

26. The hydraulic disc brake device as claimed in claim 22, wherein the first and second arc-shaped tracks of the base assembly are located correspondingly to the center of the brake disc.

27. The hydraulic disc brake device as claimed in claim 22, wherein the base assembly includes a pressing device, the pressing device includes a piston moveably sealed in an oil chamber, the oil pressure of the oil chamber serves to push the piston, a hole is formed in the first arc-shaped track, and a safety oil passage is formed in a bottom of the hole and is in communication with the oil chamber of the pressing device;
    the sliding assembly is installed on the wheel carriage;
    the brake lining assembly includes a front brake lining shoe and a rear brake lining shoe that are installed on the seat in a parallel manner, a front surface of the front brake lining shoe is pressed against the piston of the pressing device.

28. The hydraulic disc brake device as claimed in claim 22 comprising a spring assembly confined in the hole of the first arc-shaped track by the sliding member of the seat, the spring assembly includes a return spring.

29. The hydraulic disc brake device as claimed in claim 22, wherein the seat is fixed on the wheel carriage by screws.

30. The hydraulic disc brake device as claimed in claim 26, wherein the first and second arc-shaped tracks of the base assembly are square in cross section and located correspondingly to the center of the brake disc.

31. The hydraulic disc brake device as claimed in claim 25, wherein a guide cover with a central hole is disposed at each side of the control valve assembly, both ends of the control rod are protruded out of the center hole of the guide cover.

32. The hydraulic disc brake device as claimed in claim 25, wherein the relief valve includes a pressure relief steel ball, a pin and a spring disposed in the pressure relief space, respectively the pin is to be pressed by the spring and the oil pressure of the oil chamber, the pressure relief steel ball is located in the control groove, and the pin is slideably sealed between the oil chamber and the control groove.

33. The hydraulic disc brake device as claimed in claim 3 or 26, wherein the first arc-shaped track and the second arc-shaped track are covered with a wear-resistance cover.

34. The hydraulic disc brake device as claimed in claim 27, wherein a stop board is disposed at both sides of the seat, each of the two sliding members is an inverted U-shaped structure with one end closed, and when the seat moves relative to the base assembly, both ends of the control rod of the control valve assembly are controlled by the stop board of the seat.

35. The hydraulic disc brake device as claimed in claim 28, wherein the spring assembly includes a safety rod, a safety spring, a support bracket, and a return spring, one end of the return spring cooperating with the support bracket is pressed against the bottom of the hole of the first arc-shaped track, and another end of the return spring is pressed against the sliding member of the sliding assembly, the safety spring is restricted in the support bracket, and the safety rod is disposed in the support bracket, the safety rod and the return spring push the safety rod to move, so as to close the safety oil passage of the second arc-shaped track.

36. The hydraulic disc brake device as claimed in claim 20, wherein the control valve assembly includes a main cylinder which uses oil pressure to control the brake lining assembly.

37. The hydraulic disc brake device as claimed in claim 36, wherein the main cylinder of the base assembly is controlled by a steel cord on the handlebar.

38. The hydraulic disc brake device as claimed in claim 36, wherein the main cylinder of the base assembly is controlled by the handlebar.

39. The hydraulic disc brake device as claimed in claim 36, wherein the main cylinder and an elastic oil-storage cylinder are installed on the base assembly, and the elastic oil-storage cylinder serves to supply oil.

40. The hydraulic disc brake device as claimed in claim 37, wherein the main cylinder utilizes a steel cord to drive the main piston, so as to push the oil into the oil chamber, a pushing spring, an O-shaped ring, and a piston are sealed in the elastic oil-storage cylinder by a cover, the pushing spring pushes the piston to move, so as to push the oil into the main cylinder, and the oil pressure of the main cylinder is directly connected to the control valve assembly.

* * * * *